United States Patent
Aminaka et al.

(10) Patent No.: US 9,924,556 B2
(45) Date of Patent: Mar. 20, 2018

(54) RADIO COMMUNICATION SYSTEM, BASE STATION, MOBILE STATION, COMMUNICATION CONTROL METHOD, AND NON-TRANSITORY COMPUTER READABLE MEDIUM

(71) Applicant: NEC Corporation, Tokyo (JP)

(72) Inventors: Hiroaki Aminaka, Tokyo (JP); Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 155 days.

(21) Appl. No.: 14/758,876

(22) PCT Filed: Dec. 5, 2013

(86) PCT No.: PCT/JP2013/007156
§ 371 (c)(1),
(2) Date: Jul. 1, 2015

(87) PCT Pub. No.: WO2014/112000
PCT Pub. Date: Jul. 24, 2014

(65) Prior Publication Data
US 2015/0365993 A1    Dec. 17, 2015

(30) Foreign Application Priority Data

Jan. 15, 2013 (JP) ................................. 2013-004435

(51) Int. Cl.
H04W 4/00 (2009.01)
H04W 76/02 (2009.01)
H04W 84/04 (2009.01)

(52) U.S. Cl.
CPC ........ *H04W 76/025* (2013.01); *H04W 76/022* (2013.01); *H04W 84/045* (2013.01)

(58) Field of Classification Search
CPC ............. H04W 76/022; H04W 76/025; H04W 84/045

(Continued)

(56) References Cited

U.S. PATENT DOCUMENTS 8,619,618 B2 * 12/2013 Guo ........................ H04W 8/06
370/252
8,666,415 B2 *  3/2014 Wu ................... H04W 36/0022
370/328

(Continued)

FOREIGN PATENT DOCUMENTS

JP       2014-007499 A     1/2014
WO    WO-2011/137784 A1   11/2011

OTHER PUBLICATIONS

Eventhelix, "Long Term Evolution (LTE) Attach and Default Bearer Setup (Moving from Old to New MME)," retrieved from the Internet: URL:https://www.eventhelix.com/lte/attach/lte-attach.pdf, 6 pages, (retrieved on Jul. 1, 2016).

(Continued)

*Primary Examiner* — Man Phan
(74) *Attorney, Agent, or Firm* — Wilmer Cutler Pickering Hale and Dorr LLP

(57) ABSTRACT

A first base station (1) that operates a first cell (10) is configured to receive, from a mobile station (4) through a signaling radio bearer in the first cell (10), a signal containing a NAS message that causes a setup of a data bearer in a data transfer apparatus (7) within a core network (5). The first base station (1) is also configured to send, when forwarding the NAS message received from the mobile station (4) to the mobility management apparatus (6) within the core network (5), a control message that causes a suspension of the setup of the data bearer to the mobility management apparatus (6). It is thus, for example, possible to contribute to a simple establishment of a U-Plane bearer in a dual-connectivity scenario.

26 Claims, 16 Drawing Sheets

(58) Field of Classification Search
USPC .......... 370/242–259, 329–338; 455/401–450
See application file for complete search history.

(56) References Cited

U.S. PATENT DOCUMENTS

| | | | | |
|---|---|---|---|---|
| 9,247,575 | B2* | 1/2016 | Rayavarapu | H04W 76/028 |
| 9,258,839 | B2* | 2/2016 | Rayavarapu | H04W 76/028 |
| 9,295,095 | B2* | 3/2016 | Rayavarapu | |
| 9,504,081 | B2* | 11/2016 | Anderson | H04W 76/028 |
| 9,516,550 | B2* | 12/2016 | Xiong | H04W 24/02 |
| 9,572,078 | B2* | 2/2017 | Zhang | H04W 36/0033 |
| 2012/0281566 | A1* | 11/2012 | Pelletier | H04W 76/046 370/252 |
| 2013/0016696 | A1* | 1/2013 | Adjakple | H04W 76/025 370/331 |
| 2014/0004863 | A1 | 1/2014 | Zhang et al. | |
| 2015/0312957 | A1* | 10/2015 | Pelletier | H04W 74/04 370/329 |
| 2016/0095029 | A1* | 3/2016 | Dalsgaard | H04W 28/08 370/331 |

OTHER PUBLICATIONS

Extended European Search Report issued by the European Patent Office for Application No. 13871777.2 dated Jul. 8, 2016 (10 pages).

Ishii, H., et al., "A novel architecture for LTE-B: C-plane/U-plane split and Phantom Cell concept," IEEE Globecom Workshops, Anaheim, California, pp. 624-630 (Dec. 2012).

International Search Report corresponding to PCT/JP2013/007156 dated Mar. 4, 2014 (2 pages).

3GPP RP-122033, NTT DoCoMo, "New Study Item Description: Small Cell enhancements for E-UTRA and E-UTRAN—Higher-layer aspects", 3GPP TSG RAN Meeting#58, Barcelona, Spain, Dec. 4-7, 2012 (5 pages).

3GPP RWS-120010, NTT DoCoMo, "Requirements, Candidate Solutions & Technology Roadmap for LTE Rel-12 Onward", 3GPP TSG RAN Workshop on Rel-12 and Onwards, Ljubljana, Slovenia, Jun. 11-12, 2012 (pp. 1-27).

3rd Generation Partnership Project; Technical Specification Group Radio Access Network; Scenarios and Requirements for Small Cell Enhancements for E-UTRA and E-UTRAN (Release 12), 3GPP TR 36.932 V12.0.0 (Dec. 2012), 3GPP, Dec. 2012 (pp. 1-14).

NTT DoCoMo, Inc. (Rapporteur), Skeleton TR for Small Cell Enhancements-Higher Layer, 3GPP TSG-RAN WG2 #81 R2-130443, Jan. 28, 2013 (16 pages).

NEC, Consideration of the possible structures on the dual connectivity, 3GPP TSG-RAN WG2 Meeting #81 R2-130268, Jan. 28, 2013 (pp. 1-5).

Huawei, HiSilicon, Feasible scenarios and benefits of dual connectivity in small cell deployment, 3GPP TSG-RAN WG2 Meeting #81 R2-130225, Jan. 28, 2013 (pp. 1-9).

Japanese Decision to Grant a Patent issued in Japanese Patent Application No. 2014-557193, dated Jan. 30, 2018, 6 pages.

* cited by examiner

RADIO COMMUNICATION SYSTEM, BASE STATION, MOBILE STATION, COMMUNICATION CONTROL METHOD, AND NON-TRANSITORY COMPUTER READABLE MEDIUM

CROSS-REFERENCE TO RELATED APPLICATIONS

This application is a national stage application of International Application No. PCT/JP2013/007156 entitled "Radio Communication System, Base Station, Mobile Station, Communication Control Method, and Non-Transitory Computer Readable Medium" filed on Dec. 5, 2013, which claims priority to Japanese Application No. 2013-004435 filed on Jan. 15, 2013, the disclosures of which are hereby incorporated by reference in their entirety.

TECHNICAL FIELD

The present invention relates to a radio communication system, and more particularly, to network architecture in a small cell enhancement scenario.

BACKGROUND ART

In the Long Term Evolution (LTE) Release 12 according to the 3rd Generation Partnership Project (3GPP), "local area enhancement" or "small cell enhancement" for accommodation of a large amount of local traffic, improvement in throughput, and efficient use of a high-frequency band has become one of the subjects for discussion (see Non-patent literature 1). In the local area enhancement or the small cell enhancement, a low-power node (LPN) that forms a small cell is used.

Further, a dual-connectivity scenario has been proposed regarding the small cell enhancement (see Non-Patent literature 2). In one example of the dual connectivity, it is assumed that a macro cell provides a control plane (e.g., Radio Resource Control (RRC) connection and Non-Access Stratum (NAS) message forwarding) for a mobile station (User Equipment (UE)) and a small cell provides a user plane for the UE. This example of the dual connectivity may be referred to as a C/U-plane split. In one specific example of the dual-connectivity scenario, for the Control plane (C-plane), the macro cell can keep a good connection with the UE by a wide coverage using a low frequency band and to support mobility of the UE. Meanwhile, for the user plane (U-plane), the small cell can provide a local high throughput for the UE by using a wide bandwidth in a high frequency band.

In the dual-connectivity scenario, a case in which a small cell does not require transmission of existing cell specific signals/channels (e.g., Primary Synchronization Signal (PSS), Secondary Synchronization Signal (SSS), Cell-specific Reference Signal (CRS), Master Information Block (MIB), and System Information Block (SIB)) is also assumed. Such a new small cell may be referred to as a phantom cell. Further, a base station (eNB) or an LPN that provides a small cell may be referred to as a Phantom eNodeB (PhNB).

CITATION LIST

Non Patent Literature

[Non-Patent Literature 1] 3GPP RWS-120010, NTT DOCOMO, "Requirements, Candidate Solutions & Technology Roadmap for LTE Rel-12 Onward", 3GPP TSG RAN Workshop on Rel-12 and Onwards, Ljubljana, Slovenia, 11-12 Jun. 2012

[Non-Patent Literature 2] 3GPP RP-122033, NTT DOCOMO, "New Study Item Description: Small Cell enhancements for E-UTRA and E-UTRAN—Higher-layer aspects", 3GPP TSG RAN Meeting#58, Barcelona, Spain, 4-7 Dec. 2012

SUMMARY OF INVENTION

Technical Problem

As described above, the dual-connectivity scenario in which the C-plane is provided for UEs in a cell controlled by the MeNB and the U-plane is provided for the UEs in a cell controlled by the LPN has been proposed. In the following description, a cell that provides the C-Plane in the dual-connectivity scenario is referred to as a primary cell (PCell) and a cell that provides the U-Plane in the dual-connectivity scenario is referred to as a secondary cell (SCell).

The present inventors have studied about processing for establishing a U-Plane bearer in the SCell in the dual-connectivity scenario and have found various problems therewith. For example, in the LTE, a mobility management apparatus (i.e., Mobility Management Entity (MME)) in a core network executes a procedure for establishing the U-Plane bearer (i.e., E-RAB and S5/S8 bearer) in response to receiving a NAS message (e.g., Attach Request or Service Request) transmitted from the UE. Considering the dual-connectivity scenario, the MME need to set a data bearer that passes through an LPN (SCell), which is different from the MeNB (PCell), in response to the NAS message received through the MeNB (PCell). However, since the MME does not know to which LPN the U-Plane bearer should be set, it is impossible to set up the U-Plane bearer that passes through an appropriate LPN.

Accordingly, one object of the present invention is to provide a radio communication system, a base station, a mobile station, a communication control method, and a program that contribute to a simple establishment of a U-Plane bearer in the dual-connectivity scenario.

Solution to Problem

In a first aspect, a radio communication system includes: a first base station that operates a first cell; at least one second base station, each of which operates a second cell; a core network that includes a mobility management apparatus and a data transfer apparatus; and a mobile station. The mobile station has a capability to establish a data radio bearer in the second cell when the mobile station has established a signaling radio bearer in the first cell. The first base station is configured to receive, from the mobile station through the signaling radio bearer, a signal containing a NAS message that causes a setup of a data bearer in the data transfer apparatus. The first base station is further configured to send, when forwarding the NAS message to the mobility management apparatus, a control message that causes a suspension of the setup of the data bearer to the mobility management apparatus.

In a second aspect, a first base station includes: a radio communication unit that operates a first cell; and a controller. The controller is configured to receive, from a mobile station through a signaling radio bearer in the first cell, a signal containing a NAS message that causes a setup of a data bearer in a data transfer apparatus within a core network. The mobile station has a capability to establish a data radio bearer in a second cell of a second base station when the mobile station has established the signaling radio bearer in the first cell. The controller is further configured to send, when forwarding the NAS message to a mobility management apparatus within the core network, a control message that causes a suspension of the setup of the data bearer to the mobility management apparatus.

In a third aspect, a mobile station is used in combination with the radio communication system according to the first aspect stated above, and includes a radio communication unit and a controller. The controller is configured to control the radio communication unit to receive configuration information regarding the data radio bearer from the first base station and receive or transmit user data through the second cell.

In a fourth aspect, a communication control method in a first base station that operates a first cell includes:

(a) receiving, from a mobile station through a signaling radio bearer in the first cell, a signal containing a NAS message that causes a setup of a data bearer in a data transfer apparatus within a core network, the mobile station having a capability to establish a data radio bearer in a second cell of a second base station when the mobile station has established a signaling radio bearer in the first cell; and (b) sending, when forwarding the NAS message to a mobility management apparatus within the core network, a control message that causes a suspension of the setup of the data bearer to the mobility management apparatus.

In a fifth aspect, a program includes instructions for causing a computer to perform the communication control method according to the above fourth aspect.

Advantageous Effects of Invention

According to the above aspects, it is possible to provide a radio communication system, a base station, a mobile station, a communication control method, and a program that contribute to a simple establishment of a U-Plane bearer in the dual-connectivity scenario.

DESCRIPTION OF EMBODIMENTS

Hereinafter, with reference to the drawings, specific embodiments will be described in detail. Throughout the drawings, identical or corresponding components are denoted by the same reference symbols, and overlapping descriptions will be omitted as appropriate for the sake of clarification of description.

First Embodiment

Figure 1:
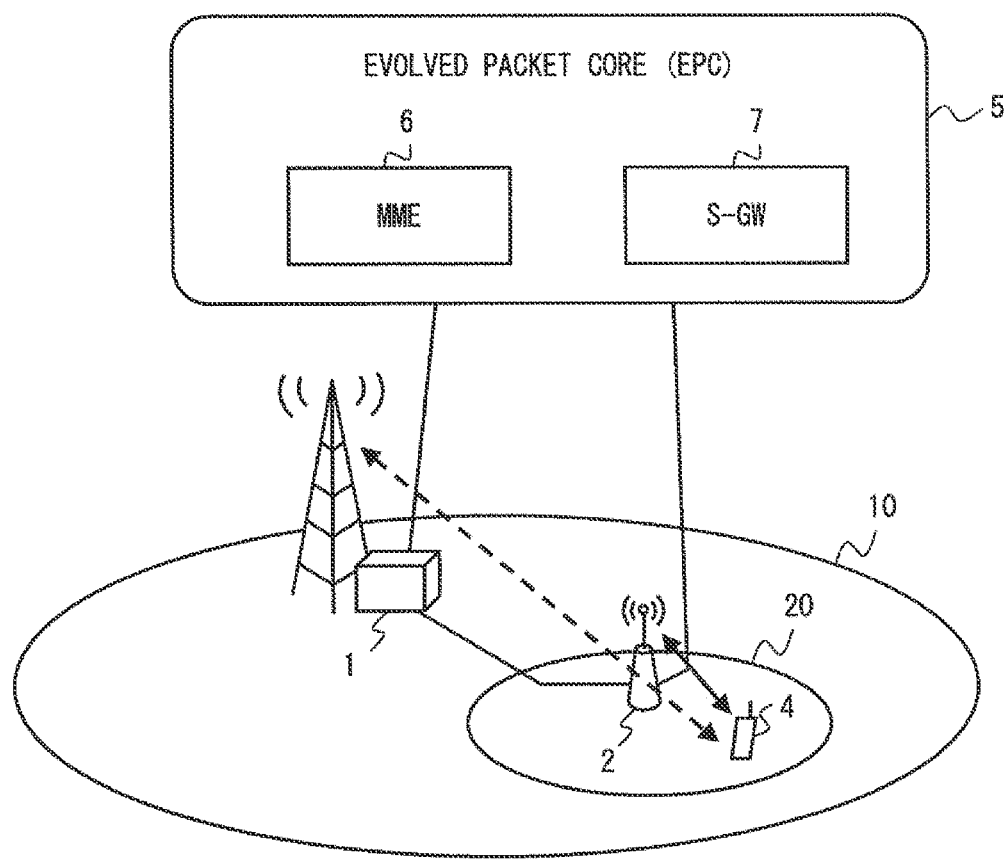
FIG. 1 is a diagram showing a configuration example of a radio communication system (e.g., LTE system) according to a first embodiment.

FIG. 1 shows a configuration example of a radio communication system according to this embodiment. The radio communication system according to this embodiment includes a first base station 1, a second base station 2, a mobile station 4, and a core network 5. The base stations 1 and 2 operate a first cell 10 and a second cell 20, respectively. The core network 5 includes a mobility management apparatus 6 and a data transfer apparatus 7. In the following description, for the sake of simplification of the description, a case in which the radio communication system according to this embodiment is an LTE system will be described as an example. Accordingly, the first base station 1 corresponds to an MeNB, the second base station 2 corresponds to an LPN, the mobile station 4 corresponds to a UE, the core network 5 corresponds to an Evolved Packet Core (EPC), the mobility management apparatus 6 corresponds to a Mobility Management Entity (MME), and the data transfer apparatus 7 corresponds to a Serving Gateway (S-GW).

The radio communication system according to this embodiment applies the dual connectivity to the cells 10 and 20. That is, the UE 4 supports the dual connectivity. In other words, the UE 4 has a capability to establish a data radio bearer (DRB) in the cell 20 when the UE 4 has established a signaling radio bearer (SRB) in the cell 10. The LPN 2 provides U-Plane services for the UE 4 in the cell 20. In other words, the LPN 2 establishes the DRB with the UE 4 in the cell 20 and transfers user data of the UE 4. The MeNB 1 provides C-plane services in the cell 10 for the UE 4, which establishes the DRB with the LPN 2. In other words, the MeNB 1 establishes the SRB with the UE 4 in the cell 10 and provides RRC signaling, for example, to establish and modify the DRB in the cell 20 of the LPN 2, and NAS message transfer between the EPC 5 and the UE 4. The MeNB 1 may transmit, on a downlink channel of the cell 10 (e.g., Physical Broadcast Channel (PBCH) or Physical Downlink Shared Channel (PDSCH)), master information (e.g., system bandwidth and the number of transmission antennas) and system information (e.g., parameters regarding the DRB in the cell 20) regarding the cell 20 of the LPN 2.

The MeNB 1 may not provide all the C-plane services regarding the UE 4. For example, the LPN 2 may control a layer 1 (physical layer) and a layer 2 (Media Access Control (MAC) sublayer and Radio Link Control (RLC) sublayer) regarding the data radio bearer that is established for the LPN 2. Specifically, the LPN 2 may receive layer 1/layer 2 control signals (e.g., Hybrid Automatic Repeat Request (H-ARQ) ACK, Channel Quality Indicator (CQI), Precoding Matrix Indicator (PMI), and Rank Indicator (RI)) using an uplink control channel (e.g., Physical Uplink Control Channel (PUCCH)) or an uplink data channel (e.g., Physical Uplink Shared Channel (PUSCH)). The LPN 2 may transmit downlink scheduling information, ACK/NACK for uplink transmission and the like to the UE 4 using a downlink control channel (e.g., Physical Downlink Control Channel (PDCCH)).

The EPC 5 is a core network that is generally managed by an operator that provides mobile communication services. The EPC 5 has control plane (C-plane) functions including mobility management (e.g., location registration and location update) and bearer management (e.g., bearer establishment, bearer modification, and bearer release) of the UE 4, and user plane (U-plane) functions including transferring user data of the UE 4 between the MeNB 1 and an external network (not shown) and between the LPN 2 and the external network. The MME 6 contributes to the C-plane functions in the EPC. The S-GW 7 contributes to the U-plane functions in the EPC. The S-GW 7 is arranged at a boundary between the EPC 5 and a radio access network (RAN) including the MeNB 1 and the LPN 2.

FIG. 1 shows only one LPN 2 arranged in the cell 10 of the MeNB 1. However, a plurality of LPNs 2 and a plurality of second cells 20 may be arranged in the cell 10 of the MeNB 1. The MeNB 1 selects a selected LPN that establishes the U-Plane bearer for the UE 4 from at least one LPN 2.

Next, a procedure for establishing the U-Plane bearer for the UE 4 according to this embodiment will be described further in detail. The MeNB 1 according to this embodiment is configured to receive, from the UE 4 through the SRB in the cell 10, an RRC message (RRC signal) containing an initial NAS message that causes a setup of the U-Plane bearer (i.e., S1 bearer, E-RAB, or EPS bearer) in the S-GW 7. The NAS message that causes the setup of the U-Plane bearer is, for example, Attach Request, Service Request, or Tracking Area Update (TAU) Request.

Further, the MeNB 1 is configured to send, when forwarding the NAS message from the UE 4 that supports the dual connectivity to the MME 6, a control message that causes a suspension of the setup of the U-Plane bearer (i.e., an S1 bearer, an E-RAB, or an EPS bearer) to the MME 6. The control message that causes the suspension of the setup of the data bearer is hereinafter referred to as a "bearer setup suspension request". The bearer setup suspension request requests the MME 6 to suspend the establishment of the U-Plane bearer. The bearer setup suspension request may indicate that a LPN 2 that terminates the S1 bearer (hereinafter referred to as a selected LPN) has not yet been determined. The selected LPN is selected from at least one LPN 2 and terminates the S1 bearer for the UE 4.

The MME 6 receives the bearer setup suspension request from the MeNB 1. Accordingly, the MME 6 can change the operation for setting up the U-Plane bearer according to whether the bearer setup suspension request has been received. In other words, the MME 6 can change the operation for setting up the U-Plane bearer according to whether the UE, which has originated the initial NAS message, supports the dual connectivity. That is, in some implementations, when the MME 6 has received the NAS message but has not received the bearer setup suspension request, the MME 6 initiates the setup of the U-Plane bearer that passes through the MeNB 1 in accordance with the normal bearer setup procedure in the LTE. On the other hand, when the MME 6 has received both of the NAS message and the bearer setup suspension request, the MME 6 performs a connection procedure for connecting the UE 4 to the core network 5 or a location update procedure regarding the UE 4 without performing the U-Plane bearer setup procedure.

In one example, the MeNB 1 may send the bearer setup suspension request together with the NAS message that causes a setup of the U-Plane bearer. In this case, the MeNB 1 may include the bearer setup suspension request into an "S1-AP: INITIAL UE MESSAGE" that is used to forward the NAS message to the MME 6.

After sending the bearer setup suspension request, the MeNB 1 may determine the selected LPN and send to the MME 6 a bearer setup request for setting up the U-Plane bearer. The bearer setup request may include LPN information indicating the selected LPN. The LPN information includes identification information that can specify the selected LPN (e.g., an address). The LPN information indicates, for example, a base station address of the selected LPN, a cell ID of the selected LPN, or a tunnel endpoint ID (TEID) of the selected LPN, or a combination thereof. In this case, the MME 6 receives the LPN information. Accordingly, the MME 6 can know an appropriate LPN 2 (i.e., the selected LPN) that should establish the S1 bearer and can set up the S1 bearer between the S-GW 7 and the appropriate selected LPN.

Figure 2:
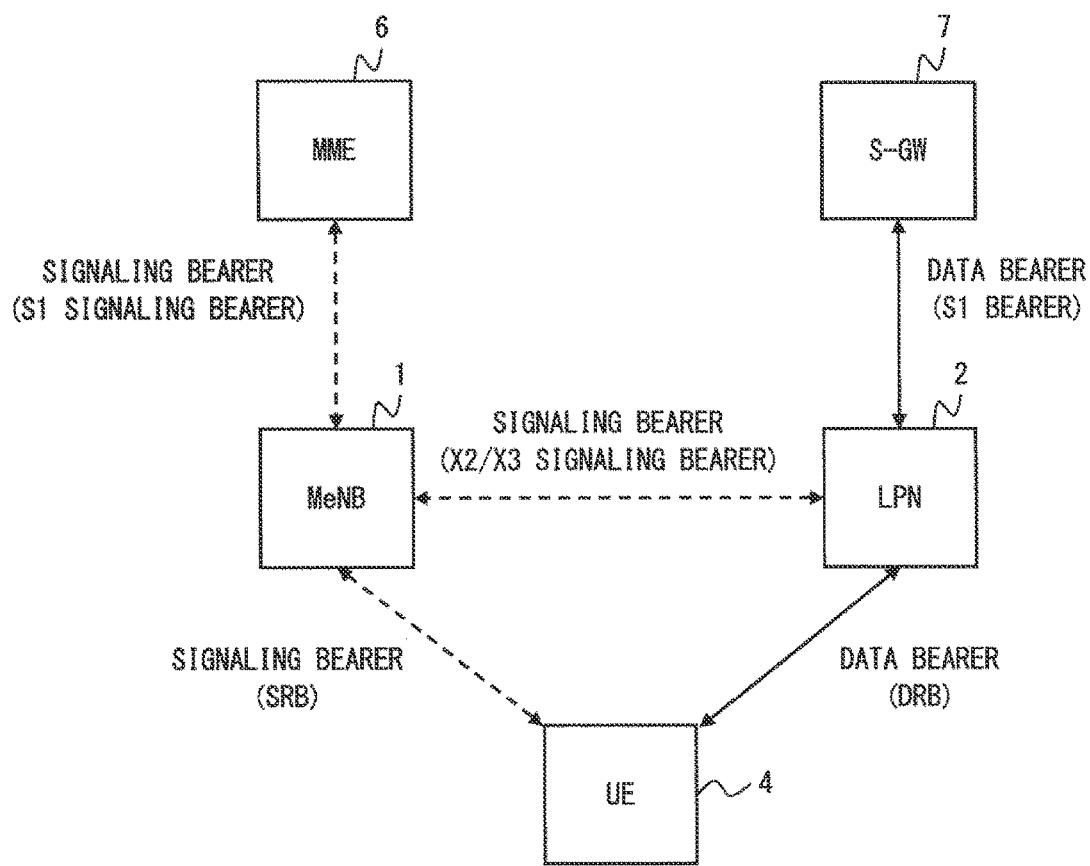
FIG. 2 is a diagram showing one example of bearer architecture in the radio communication system according to the first embodiment.

In the following description, with reference to FIGS. 2 and 3, the bearer architecture according to this embodiment will be described. FIG. 2 shows a first example of the bearer architecture related to the user data transfer in the cell 20. The radio bearer has already been described above. That is, the MeNB 1 establishes the SRB with the UE 4, and provides, in the cell 10, C-plane services including RRC signaling, for example, to establish and modify the DRB in the cell 20 and NAS message transfer between the EPC 5 and the UE 4. Meanwhile, the LPN 2 establishes the DRB with the UE 4 and transmits and receives the user data of the UE 4 on the cell 20.

Next, bearers between the EPC 5 and the MeNB 1 and between the EPC 5 and the LPN 2 will be described. A signaling bearer with the EPC 5 (i.e., S1 signaling bearer using an S1-MME interface) is established between the MME 6 and the MeNB 1. The MeNB 1 establishes the S1 signaling bearer with the MME 6 and sends and receives S1 Application Protocol (S1-AP) messages to and from the MME 6. Meanwhile, a data bearer with the EPC 5 (i.e., S1 bearer using an S1-U interface) is established between the S-GW 7 and the LPN 2. The LPN 2 establishes the S1 bearer with the S-GW 7 and sends and receives user data of the UE 4 to and from the S-GW 7.

Further, the MeNB 1 establishes a signaling bearer with the LPN 2. The signaling bearer between the MeNB 1 and the LPN 2 is established using, for example, an X2 interface. The X2 interface is an interface between eNBs. A case in which the LPN 2 is defined as a new node and a new interface different from the X2 interface is defined between the eNB and the LPN may be considered. In this case, the signaling bearer between the MeNB 1 and the LPN 2 may be established using this new interface. In this specification, this new interface is provisionally referred to as an X3 interface. The MeNB 1 is configured to send, to the LPN 2 via an X2/X3 signaling bearer, the bearer context (hereinafter referred to as E-UTRAN Radio Access Bearer (E-RAB) configuration information) that is necessary to establish the S1 bearer with the S-GW 7 and the DRB with the UE 4 in the LPN 2. The E-RAB is a radio access bearer including the DRB and the S1 bearer.

According to the bearer architecture shown in FIG. 2, the LPN 2 does not require the S1 signaling bearer with the MME 6 and can set up the DRB and the S1 bearer based on E-RAB configuration information supplied from the MeNB 1. In addition, in the above-mentioned bearer architecture, a termination point of the S1 bearer (S1-U bearer) is different from a termination point of the S1 signaling bearer. That is, the LPN 2, not the MeNB 1, terminates the S1 bearer. That is, in the architecture shown in FIG. 2, the C/U planes are separated not only with regard to the signaling in the RAN but also with regard to the interfaces between the EPC 5 and the RAN. As a result of this, the MeNB 1 is only required to perform signaling to establish the S1 bearer and the DRB necessary for the UE 4 to transmit and receive user data via the cell 20 and the LPN 2. In other words, in one example, the MeNB 1 needs not to terminate the S1 bearer (i.e., GPRS Tunneling Protocol (GTP) tunnel) for the communication of the UE 4 via the cell 20, and also needs not to perform forwarding of user data packets between the S1 bearer and the DRB. These processing are performed by the LPN 2. Accordingly, in one example, it is possible to reduce the processing load on the MeNB 1.

The S1 bearer is a GTP tunnel and the user data (data packet) is encapsulated in GTP tunnel packets to be transferred between the S-GW 7 and the LPN 2. For example, the GTP tunnel packets that encapsulate downlink user data arrive at the LPN 2 by being subjected to routing and forwarding by routers arranged between the S-GW 7 and the LPN 2. Accordingly, in the bearer architecture shown in FIG. 2, typically, the GTP tunnel packets are transferred without passing through the MeNB 1. In this case, the MeNB 1 need not carry out processing for terminating the S1 bearer and thus it is possible to reduce the processing load on the MeNB 1. Further, since the GTP tunnel packets do not flow through the X2/X3 interface between the MeNB 1 and the LPN 2, performance requirements on the capacity, the delay and the like of the X2/X3 interface are relaxed. It is possible, for example, to use a non-optical fiber line (e.g., wireless communication path) for the X2/X3 interface.

However, in some implementations, the GTP tunnel packets that encapsulate the user data may be transferred between the S-GW 7 and the LPN 2 via the MeNB 1. In this case, the MeNB 1 may function as a router (e.g., Internet Protocol (IP) router) and may perform routing and forwarding of the GTP tunnel packets. The routing of the GTP tunnel packets that pass through the MeNB 1 can be achieved by setting up routing tables included in the S-GW 7, the LPN 2, and the MeNB 1.

Figure 3:
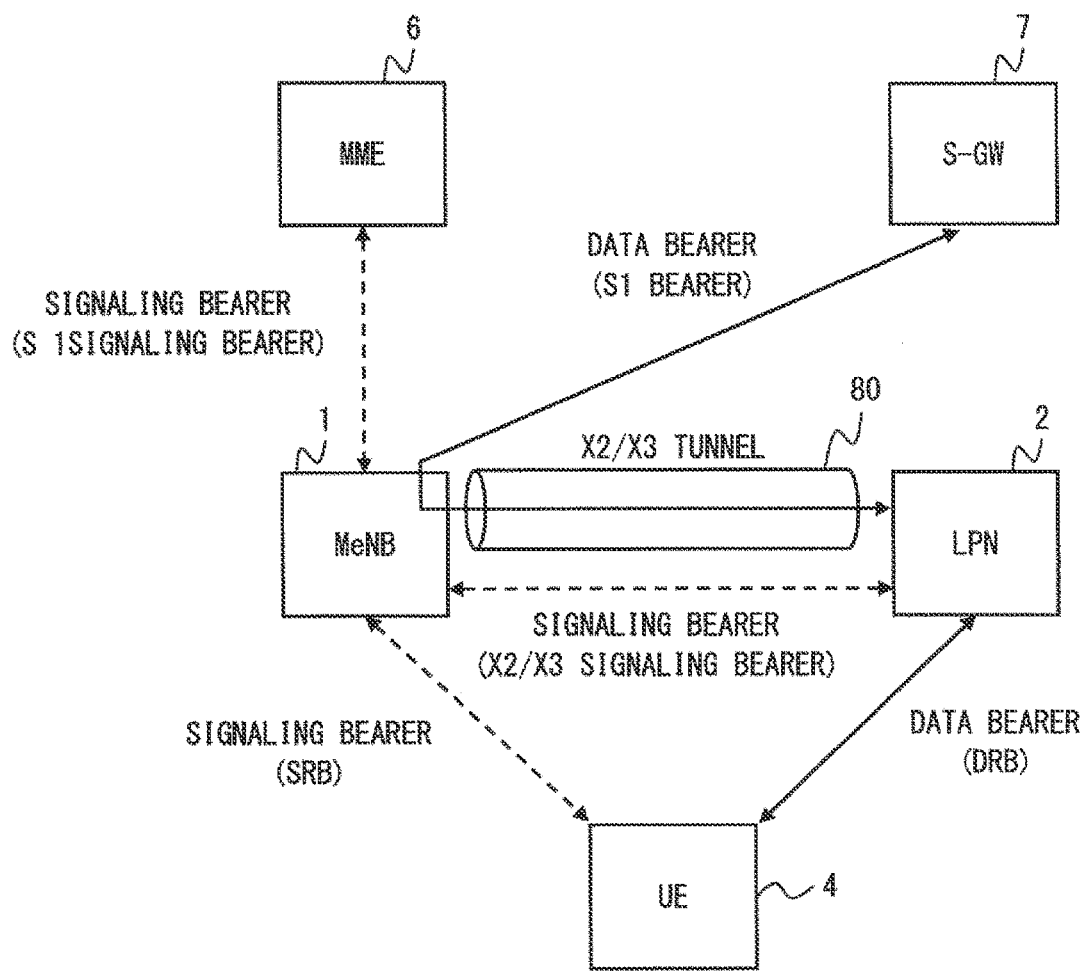
FIG. 3 is a diagram showing another example of the bearer architecture in the radio communication system according to the first embodiment.

FIG. 3 shows a second example of the bearer architecture. In the example shown in FIG. 3, the MeNB 1 performs routing and forwarding of the GTP tunnel packets. The MeNB 1 may have a proxy function to convert the IP addresses of the GTP tunnel packets. Specifically, the MeNB 1 and the LPN 2 set up a tunnel 80 (e.g., GTP Tunnel) via the X2/X3 interface. The MeNB 1 further encapsulates the GTP tunnel packets, which encapsulate the user data on the S1 bearer between the S-GW 7 and the LPN 2, and forwards the encapsulated GTP tunnel packets using the tunnel 80. The tunnel 80 may be omitted. That is, the MeNB 1 may directly forward the GTP tunnel packets without performing further encapsulation of the GTP tunnel packets.

One notable point in the example shown in FIG. 3 is that the MeNB 1 need not terminate the S1 bearer. The MeNB 1 is only required to operate as a router that forwards the GTP tunnel packets and need not perform decapsulation processing to retrieve user packets. Accordingly, an increased processing load on the MeNB 1 which is due to the GTP tunnel termination does not occur.

Another notable point in the example shown in FIG. 3 is that the MeNB 1 can monitor the GTP tunnel packets. The MeNB 1 can monitor, for example, the traffic amount of the GTP tunnel packets to be forwarded. By monitoring the traffic amount of the GTP tunnel packets, the MeNB 1 can autonomously estimate the load on the cell 20 or the load on the LPN 2. Accordingly, the MeNB 1 according to this embodiment can determine deactivation of the cell 20 or the E-RAB that passes through the LPN 2, based on the traffic amount of the GTP tunnel packets monitored by the MeNB 1.

Figure 4:
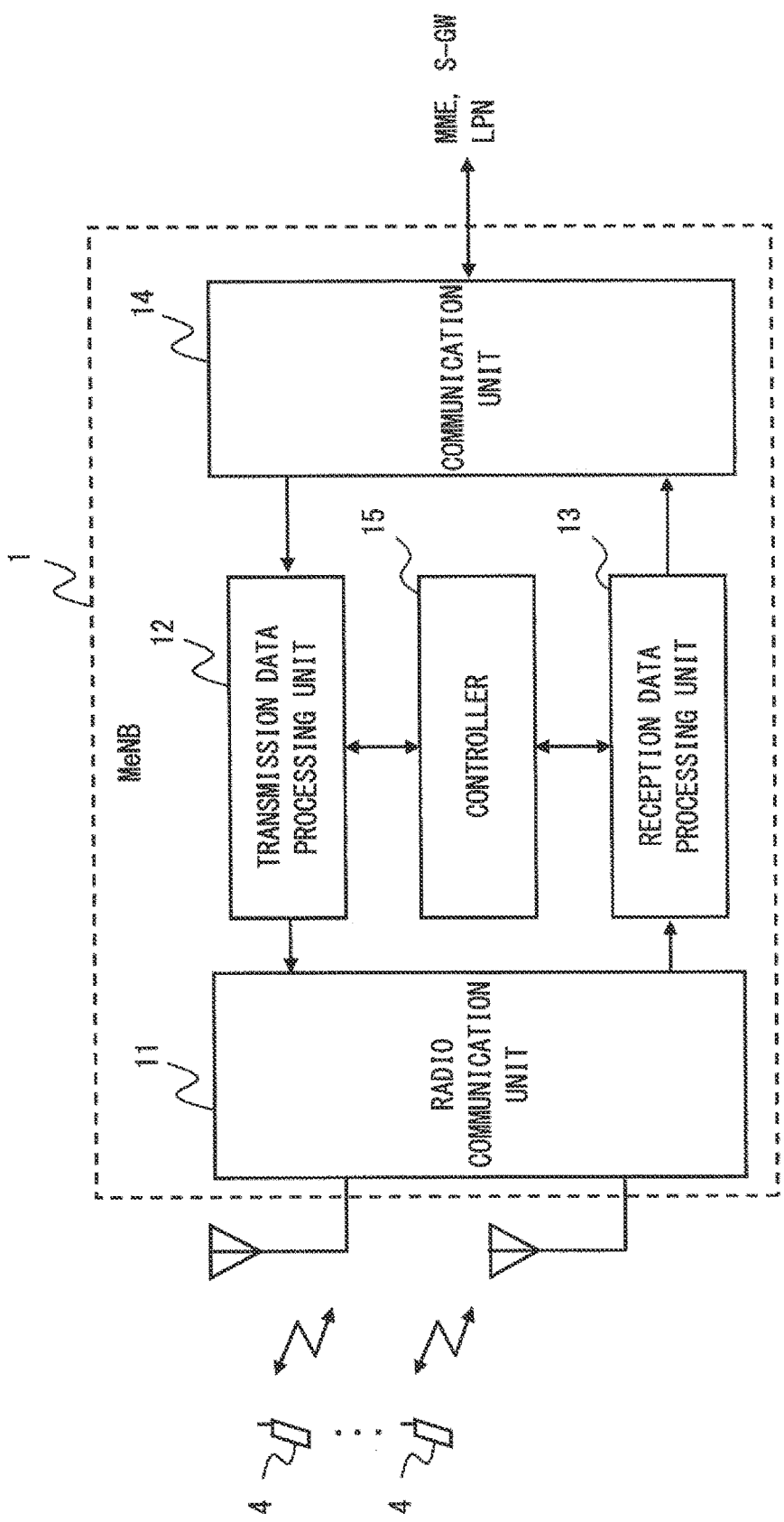
FIG. 4 is a diagram showing a configuration example of a first base station (e.g., MeNB) according to the first embodiment.

In the following description, configuration examples of the MeNB 1, the LPN 2, the UE 4, the MME 6, and the S-GW 7 according to this embodiment will be described. FIG. 4 is a block diagram showing a configuration example of the MeNB 1. A radio communication unit 11 receives an uplink signal transmitted from the UE 4 via an antenna. A reception data processing unit 13 restores the received uplink signal. The resultant received data is forwarded to another network node (e.g., the MME 6 or the S-GW 7) via a communication unit 14. For example, uplink user data received from the UE 4 in the cell 10 is forwarded to the S-GW 7. Further, NAS data among control data received from the UE 4 is forwarded to the MME 6. Further, the reception data processing unit 13 receives from a controller 15 the control data to be transmitted to the LPN 2 or the MME 6 and sends the control data to the LPN 2 or the MME 6 via the communication unit 14.

A transmission data processing unit 12 obtains user data destined for the UE 4 from the communication unit 14, and generates a transport channel by performing error correction coding, rate matching, interleaving and the like on the user data. The transmission data processing unit 12 then generates a transmission symbol sequence by adding control information to the data sequence of the transport channel. The radio communication unit 11 generates a downlink signal by performing processing such as carrier wave modulation based on the transmission symbol sequence, frequency conversion, and signal amplification, and transmits the generated downlink signal to the UE 4. Furthermore, the transmission data processing unit 12 receives the control data to be transmitted to the UE 4 from the controller 15 and transmits the control data to the UE 4 via the radio communication unit 11.

The controller 15 performs signaling with the MME 6, the LPN 2, and the UE 4 via the signaling bearers in order to enable the UE 4 to receive or transmit the user data through the cell 20 operated by the LPN 2. Specifically, the controller 15 sends, to the MME 6 via the S1 signaling bearer, the NAS message (e.g., Attach Request, Service Request, or TAU Request) that causes a setup of the U-Plane bearer. The controller 15 sends, to the LPN 2 via the X2/X3 signaling bearer, the E-RAB configuration information that is necessary to establish the S1 bearer and the DRB in the LPN 2. The controller 15 sends, to the UE 4 via the SRB in the cell 10, the DRB configuration information that is necessary to establish the DRB in the cell 20 in the UE 4. Further, as already described above, when forwarding to the MME 6 the NAS message from the UE 4 that supports the dual connectivity, the controller 15 sends the bearer setup suspension request to the MME 6.

The controller 15 may be configured to receive measurement information regarding at least one LPN 2 (hereinafter referred to as LPN measurement information) from the UE 4 and select the selected LPN from at least one LPN 2. The LPN measurement information includes, for example, measurement results regarding the radio quality in the UE 4 (e.g., Reference Signal Received Power (RSRP) or Reference Signal Received Quality (RSRQ)). The LPN measurement information may further include a list of the LPNs 2 detected by the UE 4 (e.g., a list of base station IDs or a list of cell IDs). The controller 15 may select, as the selected LPN, a LPN 2 of which the radio quality measured by the UE 4 is the highest based on the LPN measurement information. In one example, after forwarding to the MME 6 the initial NAS message (e.g., Attach Request, Service Request, or TAU Request) from the UE that supports the dual connectivity and sending the bearer setup suspension request to the MME 6, the controller 15 may receive the LPN measurement information from the UE 4 and then determine the selected LPN. After that, the controller 15 may send to the MME 6 the bearer setup request containing the LPN information indicating the selected LPN.

Figure 5:
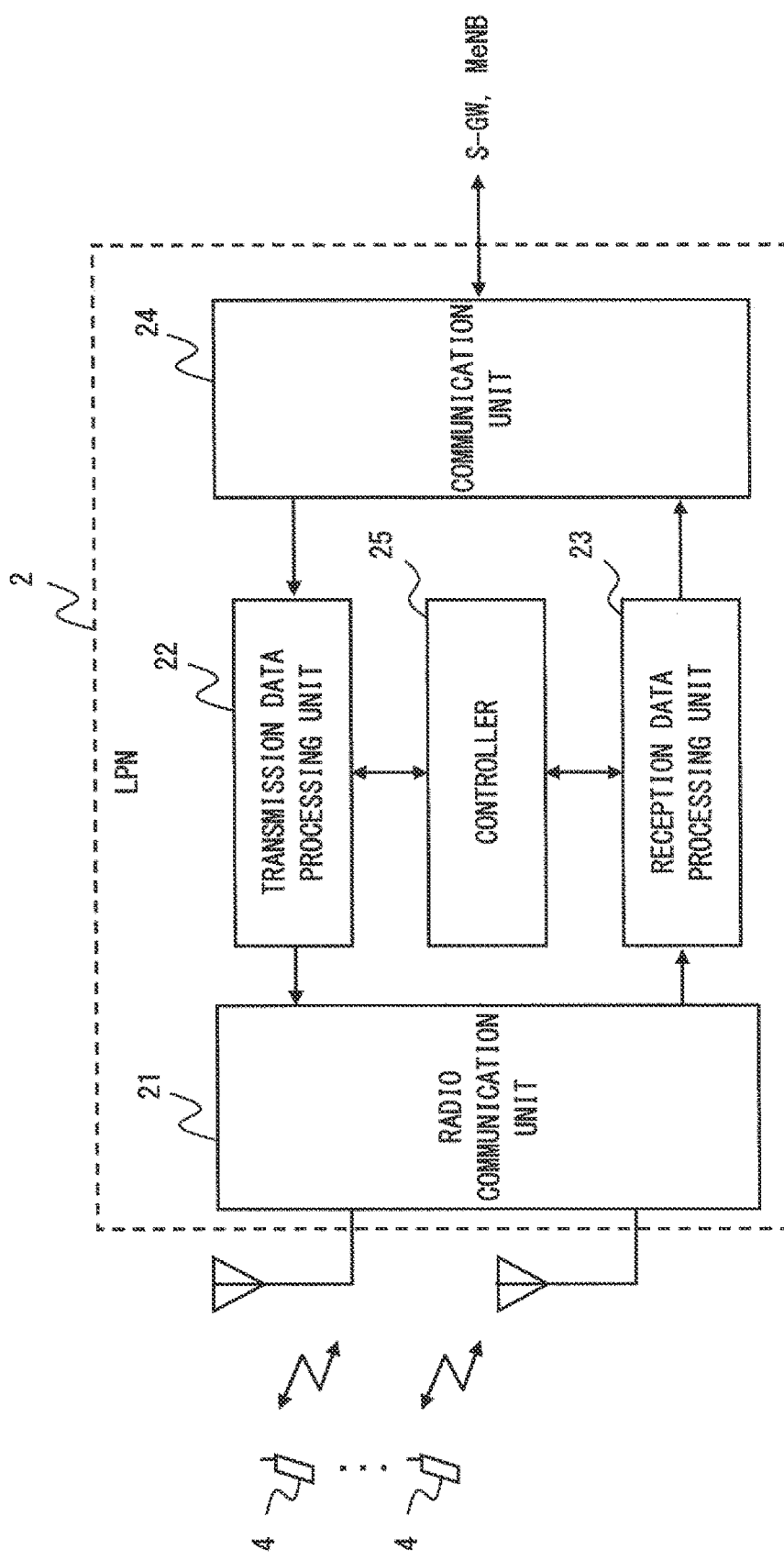
FIG. 5 is a diagram showing a configuration example of a second base station (e.g., LPN) according to the first embodiment.

FIG. 5 is a block diagram showing a configuration example of the LPN 2. The functions and the operations of a radio communication unit 21, a transmission data processing unit 22, a reception data processing unit 23, and a communication unit 24 shown in FIG. 5 are similar to those of the corresponding elements of the base station 1 shown in FIG. 4 (i.e., the radio communication unit 11, the transmission data processing unit 12, the reception data processing unit 13, and the communication unit 14).

A controller 25 of the LPN 2 receives the E-RAB configuration information from the MeNB 1 (controller 15) via the X2/X3 signaling bearer, and sets up the S1 bearer with the S-GW 7 and the SRB with the UE 4 in accordance with the E-RAB configuration information.

Figure 6:
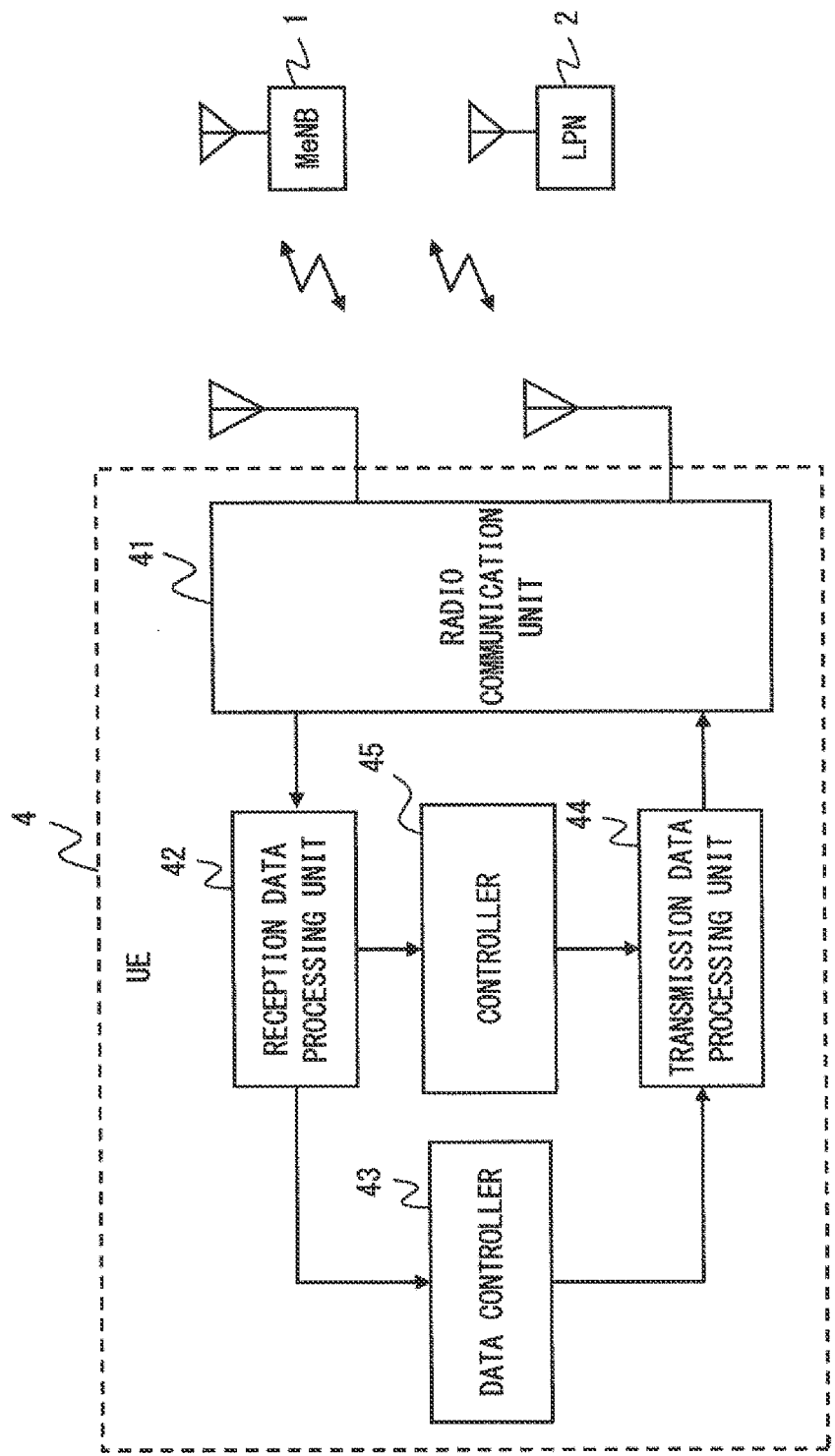
FIG. 6 is a diagram showing a configuration example of a mobile station (e.g., UE) according to the first embodiment.

FIG. 6 is a block diagram showing a configuration example of the UE 4. A radio communication unit 41 can communicate with both the cell 10 and the cell 20. In addition, the radio communication unit 41 may support carrier aggregation of a plurality of cells operated by different eNBs. In this case, the radio communication unit 41 can simultaneously use the plurality of cells 10 and 20 to transmit or receive user data. The radio communication unit 41 receives downlink signals from one or both of the eNB 1 and the LPN 2 via an antenna. A reception data processing unit 42 restores received data from the received downlink signal, and sends the received data to a data controller 43. The data controller 43 uses the received data according to the purpose thereof. A transmission data processing unit 44 and the radio communication unit 41 generate an uplink signal using transmission data supplied from the data controller 43, and transmit the uplink signal to one or both of the eNB 1 and the LPN 2.

A controller 45 of the UE 4 controls the radio communication unit 41 to establish the SRB with the MeNB 1 on the cell 10. The controller 45 then receives from the MeNB 1 the DBB configuration information to establish the DRB with the LPN 2 and controls the radio communication unit 41 to transmit or receive the user data through the cell 20. Accordingly, the UE 4 can communicate with the LPN 2 via the DRB based on the signaling with the MeNB 1.

Further, the controller 45 may measure downlink signals from at least one LPN 2 and transmit the LPN measurement information to the MeNB 1. As already stated above, the LPN measurement information is used by the MeNB 1 to determine the selected LPN.

Figure 7:
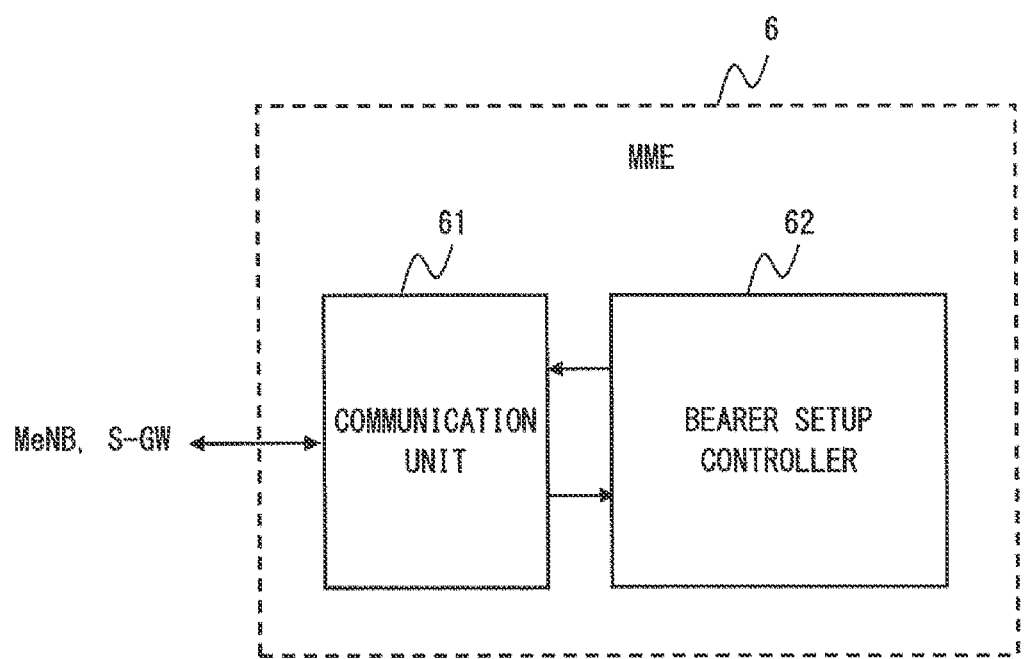
FIG. 7 is a diagram showing a configuration example of a mobility management apparatus (e.g., MME) according to the first embodiment.

FIG. 7 is a block diagram showing a configuration example of the MME 6. A communication unit 61 communicates with the MeNB 1 and the S-GW 7. A bearer setup controller 62 communicates with the MeNB 1 and the S-GW 7 via the communication unit 51, and controls the setup of the data bearer (E-RAB or S1 bearer) or the signaling bearer (S1 signaling bearer) in these apparatuses. Specifically, in response to receiving the initial NAS message (e.g., Attach Request, Service Request, or TAU Request) from the UE 4 via the MeNB 1, the bearer setup controller 62 requests the S-GW 7 to set up the S1 bearer and sends to the MeNB 1 the bearer configuration information regarding the E-RAB (i.e., E-RAB configuration information).

Further, the bearer setup controller 62 receives the bearer setup suspension request from the MeNB 1 when receiving the initial NAS message from the UE 4 that supports the dual connectivity. Accordingly, the bearer setup controller 62 can change the operation for setting up the U-Plane bearer according to whether the UE, which has originated the initial NAS message, supports the dual connectivity. That is, in some implementations, when the bearer setup controller 62 has received the NAS message but has not received the bearer setup suspension request, the bearer setup controller 62 initiates the setup of the U-Plane bearer that passes through the MeNB 1 in accordance with the normal bearer setup procedure in the LTE. On the other hand, when the MME 6 has received both of the NAS message and the bearer setup suspension request, the MME 6 performs a connection procedure for connecting the UE 4 to the core network 5 or a location update procedure regarding the UE 4 without executing the U-Plane bearer setup procedure.

Figure 8:
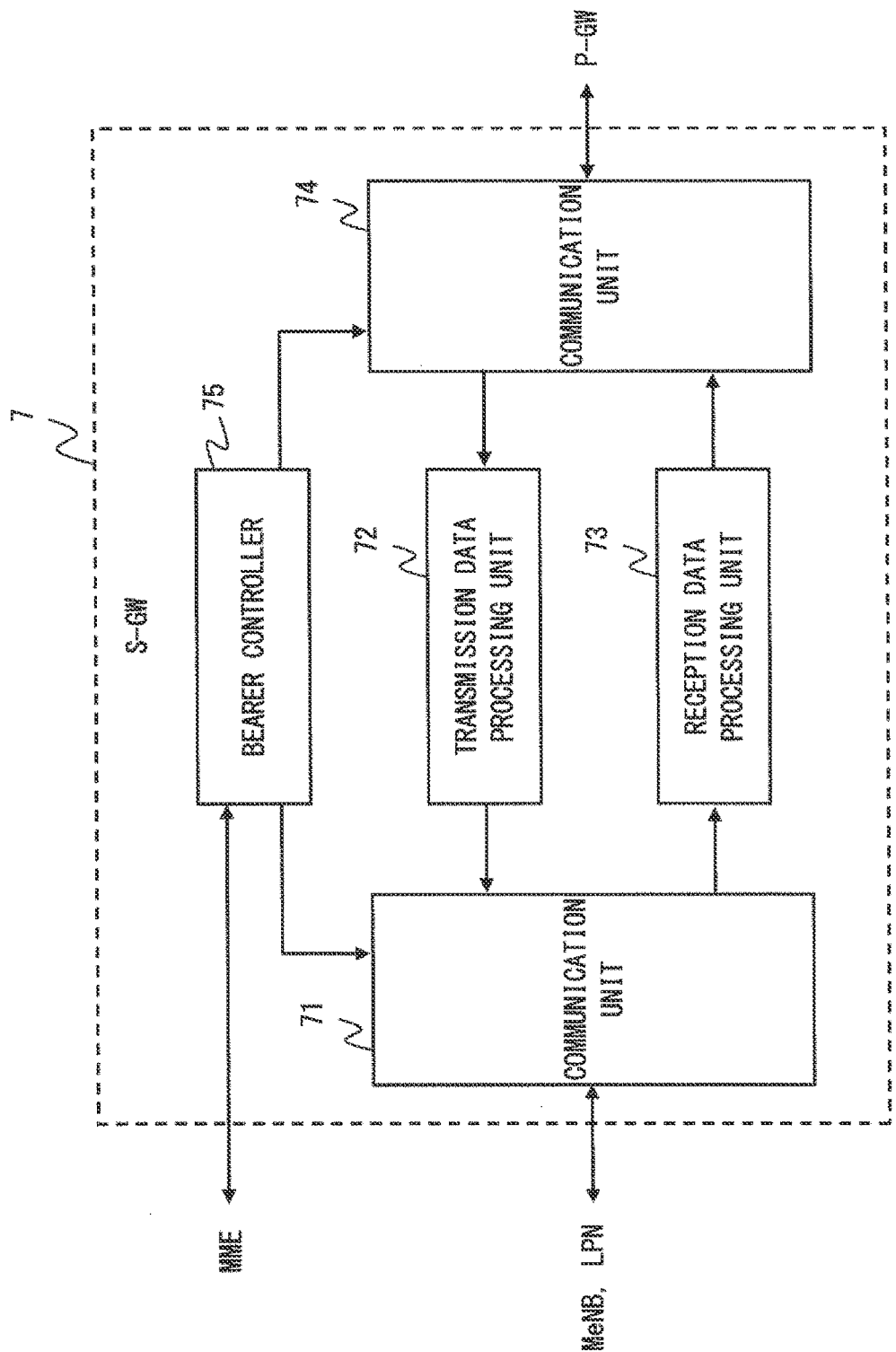
FIG. 8 is a diagram showing a configuration example of a data transfer apparatus (e.g., S-GW) according to the first embodiment.

FIG. 8 is a block diagram showing a configuration example of the S-GW 7. A communication unit 71 establishes the S1 bearer with the LPN 2 and transmits or receives user data to or from the LPN 2 through the S1 bearer. The communication unit 71 may establish the S1 bearer with the MeNB 1 to enable the UE 4 to receive or transmit the user data through the cell. A communication unit 74 sets up the S5/S8 bearer with a Packet Data Network Gateway (P-GW) in the EPC 5 and transmits and receives the user data to and from another data transfer apparatus.

A transmission data processing unit 72 receives downlink user data destined for the UE 4 from the communication unit 74, and forwards the downlink user data to the S1 bearer based on mapping between the upstream side S5/S8 bearer and the downstream side S1 bearer. A reception data processing unit 73 receives uplink user data from the communication unit 71 and forwards the uplink user data to the S5/S8 bearer based on the mapping between the S5/S8 bearer and the S1 bearer.

Figure 9:
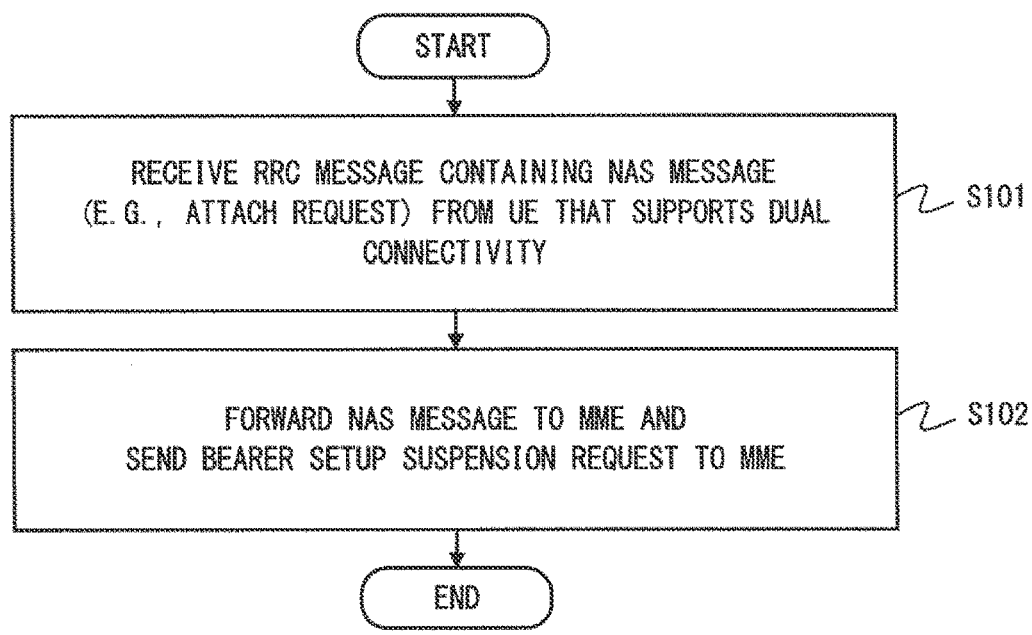
FIG. 9 is a flowchart showing an operation example of the first base station (e.g., MeNB) according to the first embodiment.

In the following description, a specific example of a procedure for establishing the U-Plane bearer in the SCell will be described. FIG. 9 is a flowchart showing an operation example of the MeNB 1 regarding the establishment of the U-Plane bearer in the SCell. In Step S101, the MeNB 1 (controller 15) receives the RRC message containing the initial NAS message (e.g., Attach Request, Service Request, or TAU Request) from the UE 4, which supports the dual connectivity. In Step S102, the MeNB 1 forwards the NAS message received from the UE 4 to the MME 6 and sends the U-Plane bearer setup suspension request to the MME 6.

Figure 10:
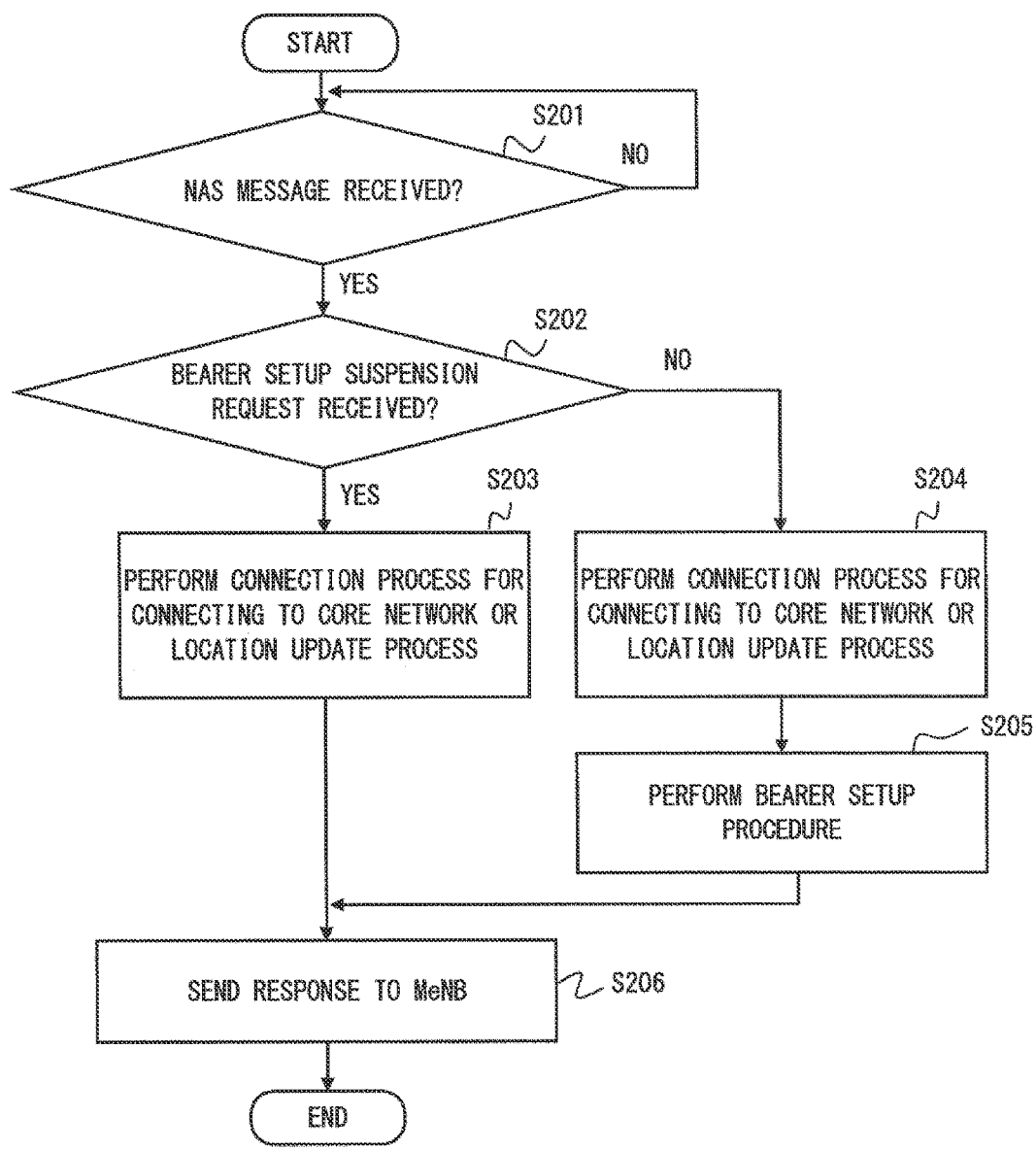
FIG. 10 is a flowchart showing an operation example of the mobility management apparatus (e.g., MME) according to the first embodiment.

FIG. 10 is a flowchart showing an operation example of the MME 6 regarding the establishment of the U-Plane bearer in the SCell. In Step S201, the MME 6 (bearer setup controller 62) determines whether a NAS message that causes a setup of the U-Plane bearer has been received from the MeNB 1. When the NAS message has been received (YES in Step S201), the MME 6 determines whether the bearer setup suspension request that accompanies the NAS message has been received. When the bearer setup suspension request has been received (YES in Step S202), the MME 6 performs the connection process for connecting the UE 4 to the core network 5 or the location update process regarding the UE 4 without performing the bearer setup procedure (Step S203). On the other hand, when the bearer setup suspension request has not been received (NO in Step S202), the MME 6 performs the normal bearer setup procedure in the LTE (Steps S204 and S205). In Step S206, the MME 6 sends a response message to the MeNB 1.

Figure 11:
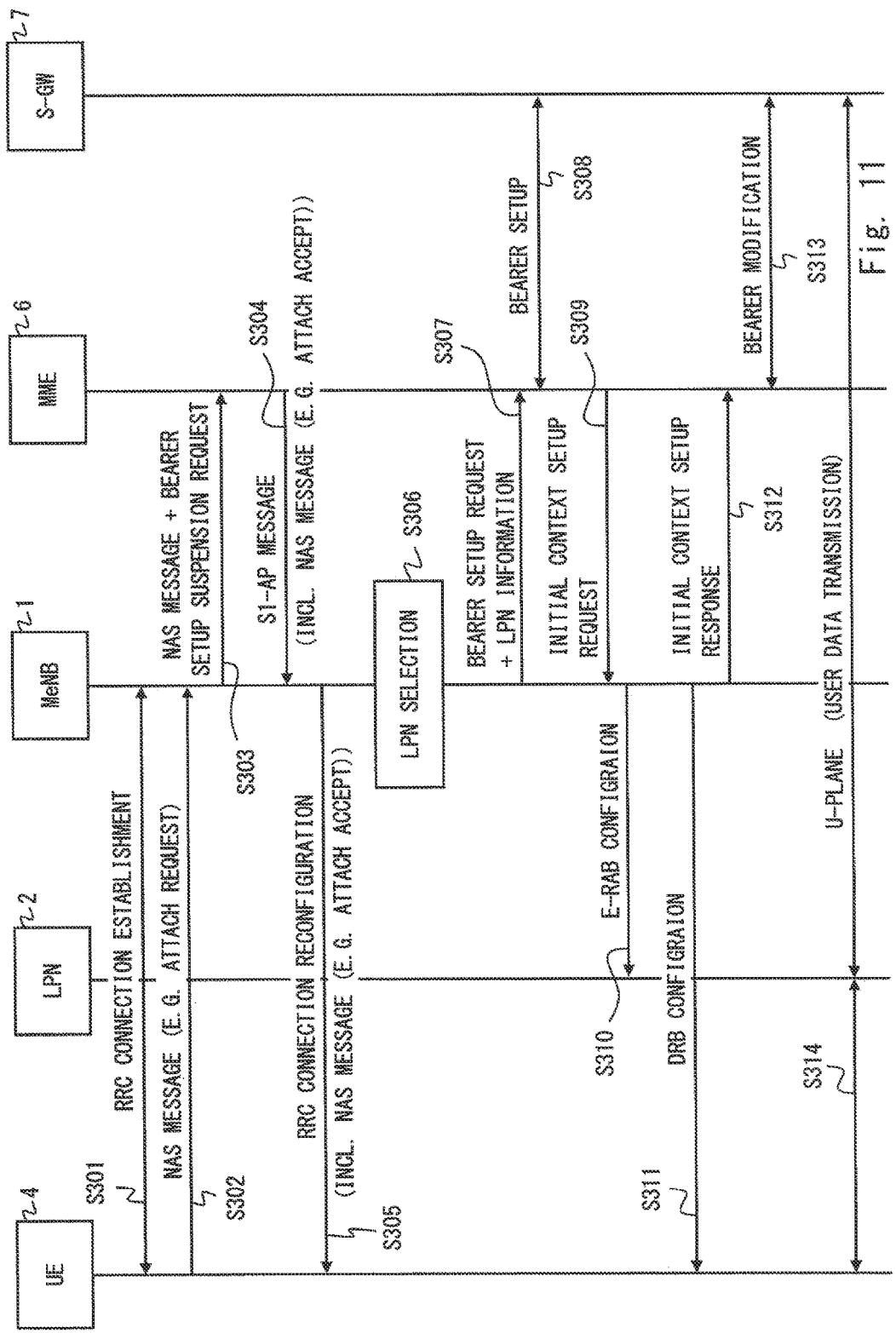
FIG. 11 is a sequence diagram showing one example of a communication control method according to the first embodiment.

FIG. 11 is a sequence diagram showing a first example of the procedure for establishing the U-Plane bearer in the SCell. In the example shown in FIG. 11, the MeNB 1 determines the selected LPN in response to receiving the RRC message containing the NAS message from the UE 4 and sends the LPN information indicating the selected LPN to the MME 6 together with the bearer setup request. In Step S301, the MeNB 1 and the UE 4 establish an RRC connection. In Step S302, the UE 4 sends the NAS message (e.g., Attach Request, Service Request, or TAU Request) that requests for setting up the U-Plane bearer. The establishment of the RRC connection in the LTE includes establishment of the signaling radio bearer (i.e., SRB 1) and transfer of an initial uplink NAS message. That is, the NAS message transmitted in Step S302 is contained in an RRC Connection Setup Complete message transmitted to the MeNB 1 from the UE 4 at the last stage of the RRC connection establishment procedure (Step S301).

In Step S303, the MeNB 1 forwards the NAS message to the MME 6 and also sends the bearer setup suspension request to the MME 6. In one example, the MeNB 1 may include the bearer setup suspension request into the "S1-AP: INITIAL UE MESSAGE" that is used to forward the NAS message. In Step S304, the MME 6 performs the connection process for connecting the UE 4 to the core network 5 or the location update process regarding the UE 4 without performing the bearer setup procedure. The MME 6 sends a response message (S1-AP message) containing the NAS message (e.g., Attach Accept) to the MeNB 1. In Step S305, the MeNB 1 forwards the NAS message received from the MME 6 to the UE 4. For example, the MeNB 1 may send the NAS message using an RRC Connection Reconfiguration message.

In Step S306, the MeNB 1 determines the selected LPN from at least one LPN 2. In one example, the MeNB 1 may receive the LPN measurement information from the UE 4 and determine the LPN 2 of high reception quality at the UE 4 as the selected LPN. In Step S307, the MeNB 1 sends the bearer setup request in order to request the MME 6 to establish the U-Plane bearer for the UE 4. The MeNB 1 also sends the LPN information indicating the selected LPN to the MME 6 together with the bearer setup request. The MeNB 1 may include the LPN information into the S1-AP message that is used to forward the NAS message.

In Step S308, the MME 6 and the S-GW 7 perform the procedure for setting up the bearer for the UE 4. That is, the MME 6 sends a Create Session Request message to the S-GW 7. The S-GW 7 receives the Create Session Request message, generates a new entry in an EPS bearer context table, communicates with a P-GW (not shown) to configure a bearer context of the S5/S8 bearer, and configures the S-GW 7 side endpoint of the S1 bearer. The S-GW 7 sends a response (i.e., Create Session Response message) including an S1 bearer context to the MME 6. The S1 bearer context includes, for example, a tunnel endpoint identifier (TEID) and an address of the S-GW 7 in the U-plane. The TEID indicates the S-GW 7 side endpoint of the GTP tunnel as the S1 bearer. In Step S206, the MME 6 sends an INITIAL CONTEXT SETUP REQUEST message to the MeNB 1. The INITIAL CONTEXT SETUP REQUEST message includes an E-RAB bearer context (E-RAB configuration information).

In Step S310, the MeNB 1 sends the E-RAB configuration information to the LPN 2 (in this example, selected LPN) via the X2/X3 signaling bearer. The E-RAB configuration information includes S1 bearer configuration information and DRB configuration information. The LPN 2 sets up the S1 bearer and the DRB in accordance with the E-RAB configuration information. The S1 bearer configuration information includes information that is necessary to establish the S1 bearer with the S-GW 7. The S1 bearer configuration information includes, for example, at least one of the E-RAB ID, a Quality Class Indicator (QCI), the IP address of the S-GW 7, the S-GW 7 side TEID of a GTP tunnel (S1 bearer), a security key, and a Temporary Mobile Subscriber Identity (TMSI) allocated to the UE 4. Further, the DRB configuration information includes configuration information that is necessary to establish the DRB with the UE 4. The DRB configuration information includes, for example, the E-RAB ID, a Quality Class Indicator (QCI), and configuration information of the physical layer and the MAC sublayer.

In Step S311, the MeNB 1 transmits, to the UE 4 through the SRB in the cell 10, the DRB configuration information regarding the DRB in the cell 20. The DRB configuration information is transmitted using an RRC Connection Reconfiguration message. The UE 4 sets up the DRB in accordance with the DRB configuration information.

In Step S312, the MeNB 1 sends a message indicating E-RAB setup completion (i.e., INITIAL CONTEXT SETUP RESPONSE message) to the MME 6. This message includes LPN 2 side configuration information regarding the S1 bearer (e.g., the address and the TEID of the selected LPN). In Step S210, the MME 6 and the S-GW 7 modify the EPS bearer context based on the INITIAL CONTEXT SETUP RESPONSE message. That is, the MME 6 sends to the S-GW 7 a message (i.e., MODIFY BEARER REQUEST message) containing the TEID and the address of the selected LPN. The S-GW 7 updates the S1 bearer configuration with the TEID and the address of the LPN 2 received from the MME 6.

According to the above processing of Steps S302 to S313, the E-RAB that passes through the LPN 2 has been configured between the UE 4 and the S-GW 7. In Step S314, the UE 4 receives or transmits user data via the cell 20 and the LPN 2.

Figure 12:
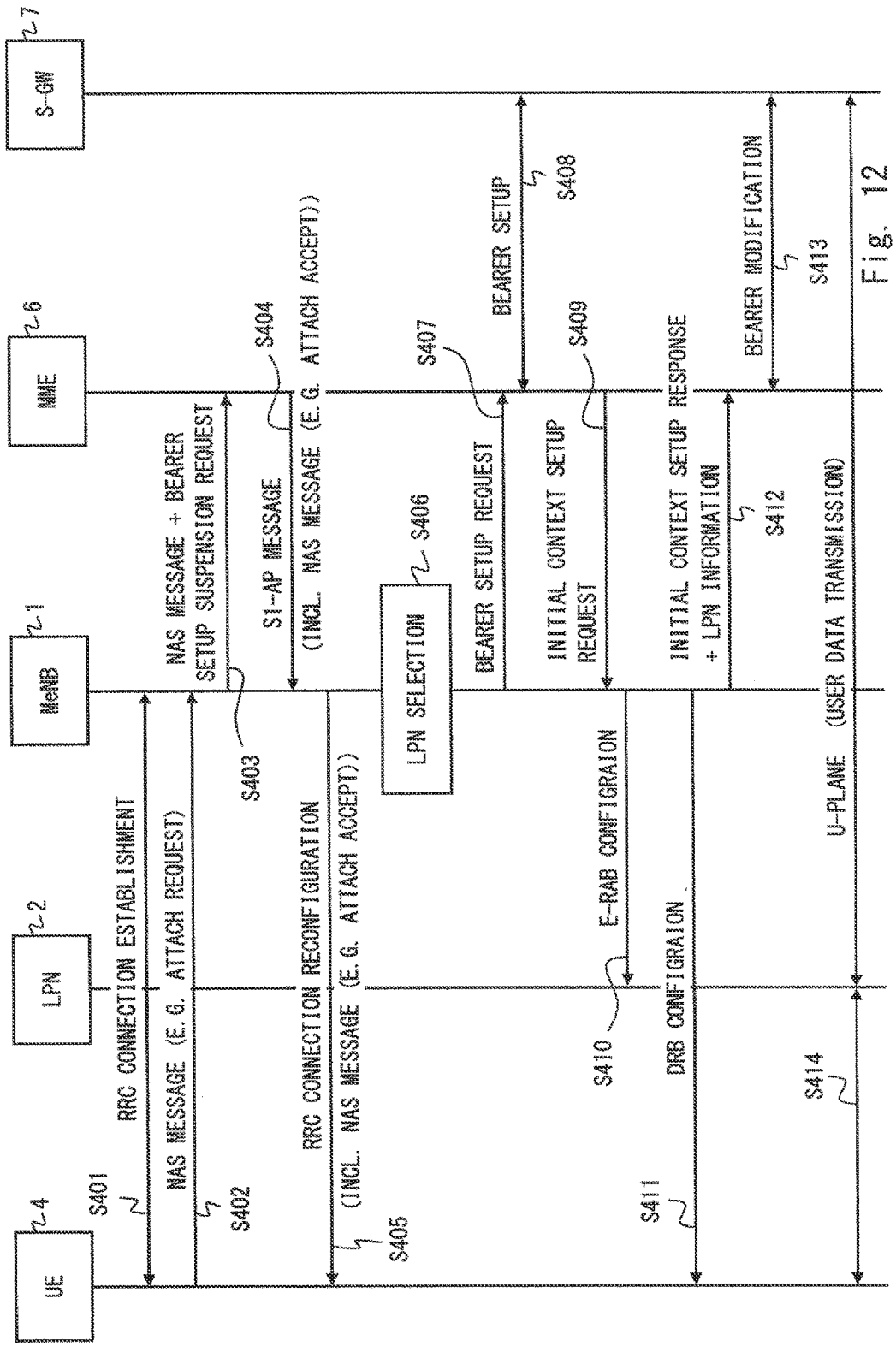
FIG. 12 is a sequence diagram showing another example of the communication control method according to the first embodiment.

Next, a modified example of the U-Plane bearer establishment procedure will be described. FIG. 12 is a sequence diagram showing a second example of the procedure for establishing the U-Plane bearer in the SCell. In the example shown in FIG. 12, the MeNB 1 receives, after sending the bearer setup request (Step S407) to the MME 6, the bearer context regarding the S1 bearer from the MME 6 (Step S409), sends the bearer context to the selected LPN (Step S410), and then sends the LPN information to the MME 6 after the S1 bearer has been configured in the selected LPN (Step S412). Specifically, the MeNB 1 includes the LPN information into the S1-AP: INITIAL CONTEXT SETUP COMPLETE MESSAGE" that is used to notify the MME 6 of the completion of the bearer setup.

The processing in Steps S401 to S406 in FIG. 12 is similar to the processing in Steps S301 to S306 shown in FIG. 11. In Step S407, the MeNB 1 sends the bearer setup request to the MME 6 but does not send the LPN information. The processing in Steps S408 to S411 is similar to the processing in Steps S308 to S311 shown in FIG. 11. Specifically, in Step S408, the MME 6 and the S-GW 7 perform the EPS bearer setup procedure. In Step S409, the MME 6 sends the INITIAL CONTEXT SETUP REQUEST message to the MeNB 1. The INITIAL CONTEXT SETUP REQUEST message contains the E-RAB bearer context (E-RAB configuration information). In Step S410, the MeNB 1 sends the E-RAB configuration information to the selected LPN via the X2/X3 signaling bearer. In Step S411, the MeNB 1 transmits, to the UE 4 through the SRB in the cell 10, the DRB configuration information regarding the DRB in the cell 20.

In Step S412, the MeNB 1 sends a message indicating the E-RAB setup completion (i.e., INITIAL CONTEXT SETUP RESPONSE message) to the MME 6. This INITIAL CONTEXT SETUP RESPONSE message contains the LPN information indicating the selected LPN. In this case, the LPN information may be LPN 2 side configuration information regarding the S1 bearer (e.g., the address and the TEID of the selected LPN). In Step S413, the MME 6 and the S-GW 7 modify the EPS bearer context based on the INITIAL CONTEXT SETUP RESPONSE message. That is, the MME 6 sends a message (i.e., MODIFY BEARER REQUEST message) containing the address and the TEID of the selected LPN to the S-GW 7. The S-GW 7 updates the S1 bearer configuration with the address and the TEID of the LPN 2 received from the MME 6.

According to the above processing of Steps S402 to S413, the E-RAB that passes through the LPN 2 has been configured between the UE 4 and the S-GW 7. In Step S414, the UE 4 receives or transmits user data via the cell 20 and the LPN 2.

Note that, in Step S306 shown in FIG. 11 and Step S406 shown in FIG. 12, the MeNB 1 may select the MeNB 1 itself when there is no appropriate LPN 2. In one example, the MeNB 1 may configure the U-Plane bearer for the UE 4 in the cell 10 of the MeNB 1 when any LPN reception quality measured by the UE 4 is below a reference value.

Second Embodiment

In this embodiment, a specific example of the procedure for determining the selected LPN using the LPN measurement information from the UE 4 will be described. A configuration example of a radio communication system according to this embodiment is similar to that shown in FIG. 1. The MeNB 1 according to this embodiment receives the LPN measurement information from the UE 4 and then determines the selected LPN based on the LPN measurement information.

Figure 13:
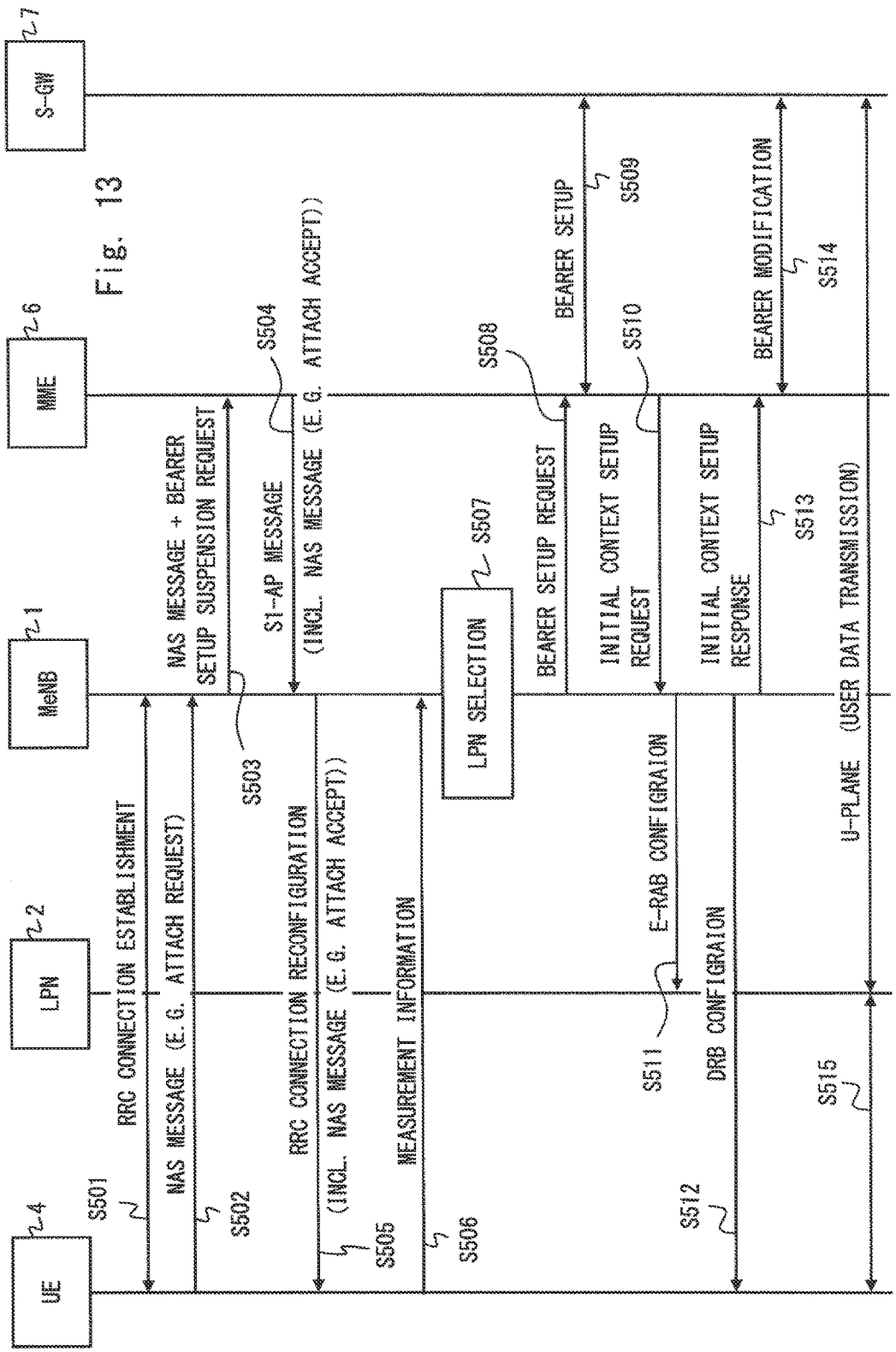
FIG. 13 is a sequence diagram showing one example of a communication control method according to a second embodiment.

FIG. 13 is a sequence diagram showing a specific example of the U-Plane bearer establishment procedure according to this embodiment. The processing in Steps S501 to S505 is similar to the processing in Steps S301 to S305 shown in FIG. 11 (or Steps S401 to S405 shown in FIG. 12). In Step S506, the UE 4 transmits the LPN measurement information to the MeNB 1. The UE 4 may transmit the LPN measurement information using a Measurement Report message. In Step S507, the MeNB 1 determines the selected LPN based on the LPN measurement information. The processing in Steps S508 to S515 is similar to the processing in Steps S307 to S314 shown in FIG. 11 (or Steps S407 to S414 in FIG. 12).

Figure 14:
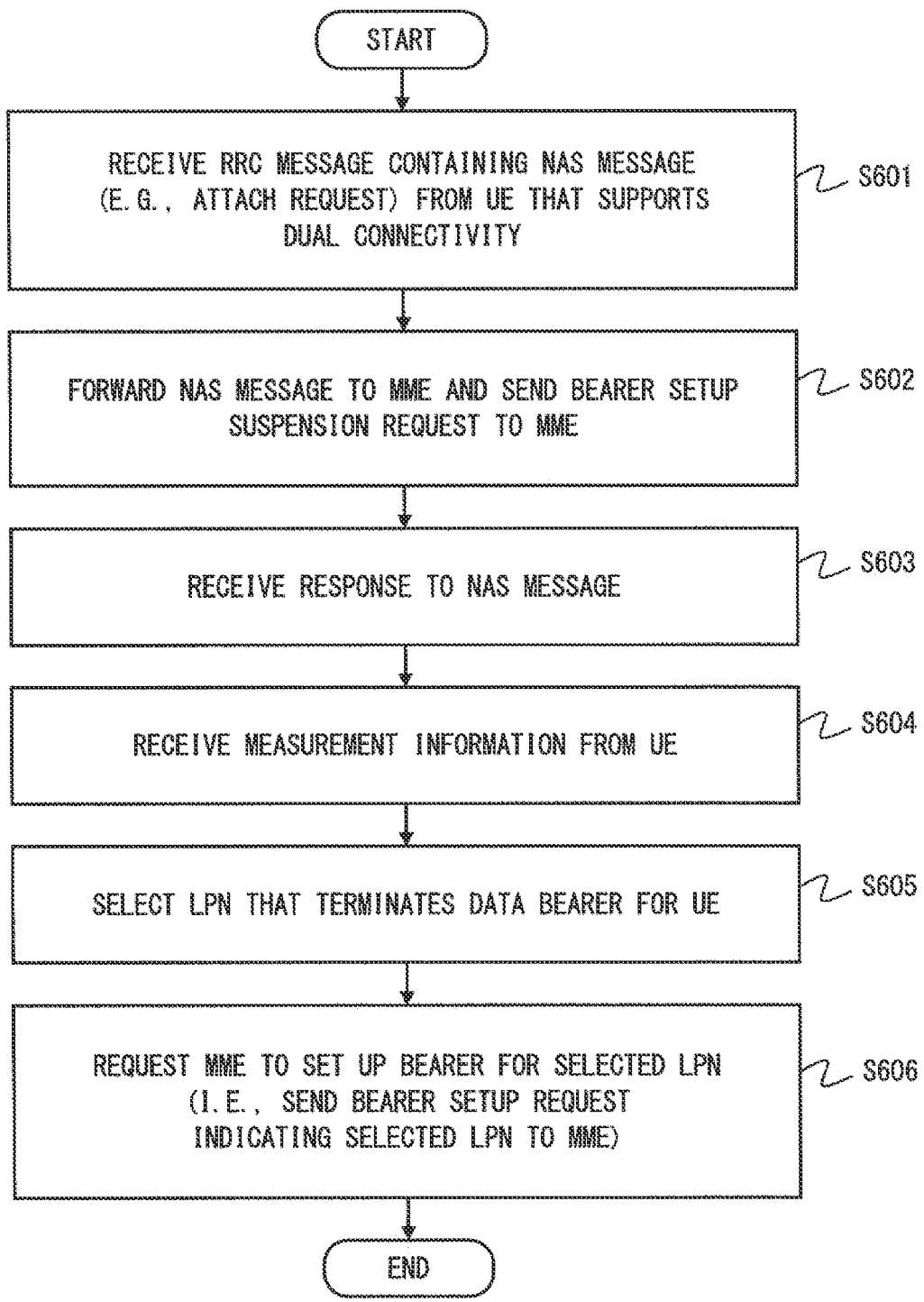
FIG. 14 is a flowchart showing an operation example of a first base station (e.g., MeNB) according to the second embodiment.

FIG. 14 is a flowchart showing an operation example of the MeNB 1 according to this embodiment. The processing in Steps S601 and S602 is similar to the processing in Steps S101 and S102 shown in FIG. 9. In Step S603, the MeNB 1 (controller 15) receives from the MME 6 a response to the NAS message. In Step S604, the MeNB 1 receives the LPN measurement information from the UE 4. In Step S605, the MeNB 1 determines the selected LPN that terminates the data bearer (S1 bearer) for the UE 4 based on the LPN measurement information. In Step S606, the MeNB 1 requests the MME 6 to set up a bearer regarding the selected LPN. Specifically, the MeNB 1 sends to the MME 6 the LPN information, which indicates the selected LPN, and the bearer setup request. As described in the first embodiment, the MeNB 1 may send the LPN information to the MME 6 when sending to the MME 6 a bearer setup response (i.e., INITIAL CONTEXT SETUP RESPONSE message) after the setup of the U-Plane bearer (E-RAB) in the selected LPN has been completed.

Figure 15:
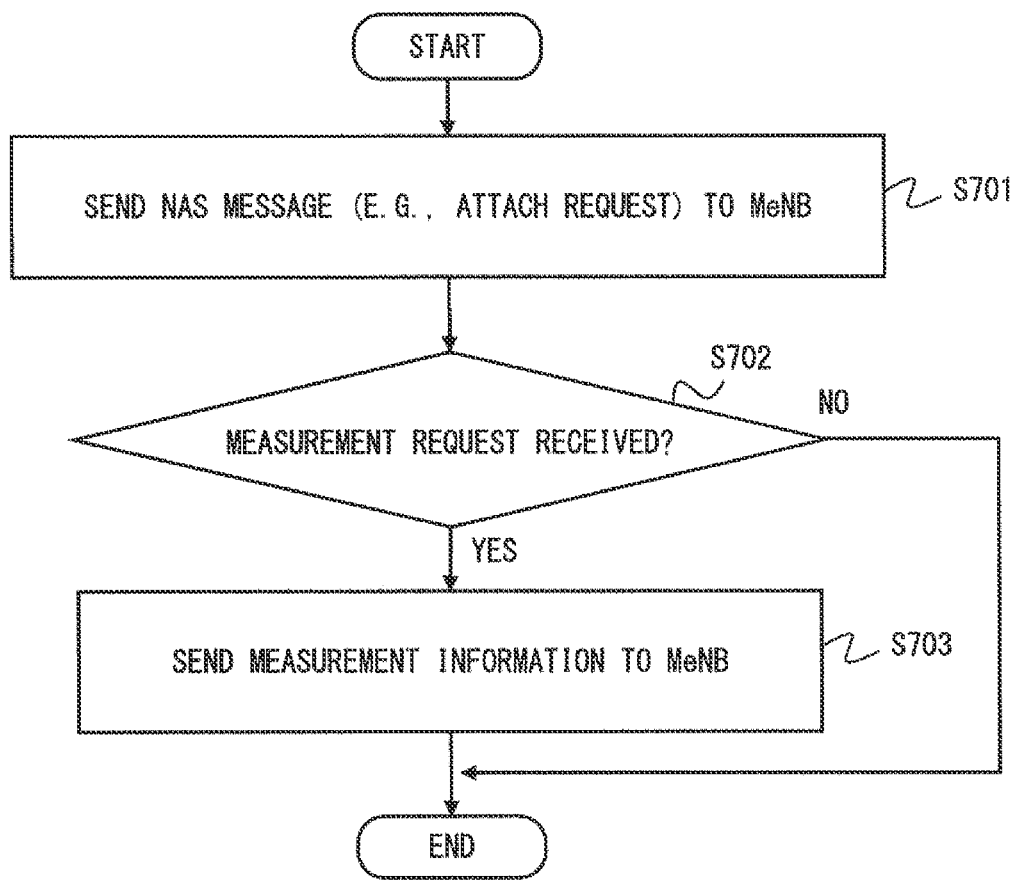
FIG. 15 is a flowchart showing an operation example of a mobile station (e.g., UE) according to the second embodiment.

FIG. 15 is a flowchart showing an operation example of the UE 4 according to this embodiment. In Step S701, the UE 4 (controller 45) sends the initial NAS message (e.g., Attach Request, Service Request, or TAU Request) that causes a setup of the U-Plane bearer. In Steps S6702 and S703, the UE 4 transmits the LPN measurement information to the MeNB 1 in response to receiving the LPN measurement request from the MeNB 1. The UE 4 may measure downlink signals from LPNs 2 in response to the instruction from the MeNB 1 (Step S702). The UE 4 may send to the MeNB 1, as the LPN measurement information, a measurement log that has been obtained in advance by the UE 4 during an idle mode.

Third Embodiment

This embodiment shows first to third examples of the procedure for detecting the UE that supports the dual connectivity. The procedure for detecting the UE that supports the dual connectivity described in this embodiment can be combined with any of the first and second embodiments stated above. A configuration example of a radio communication system according to this embodiment is similar to that shown in FIG. 1.

(First Detection Procedure)

Figure 16:
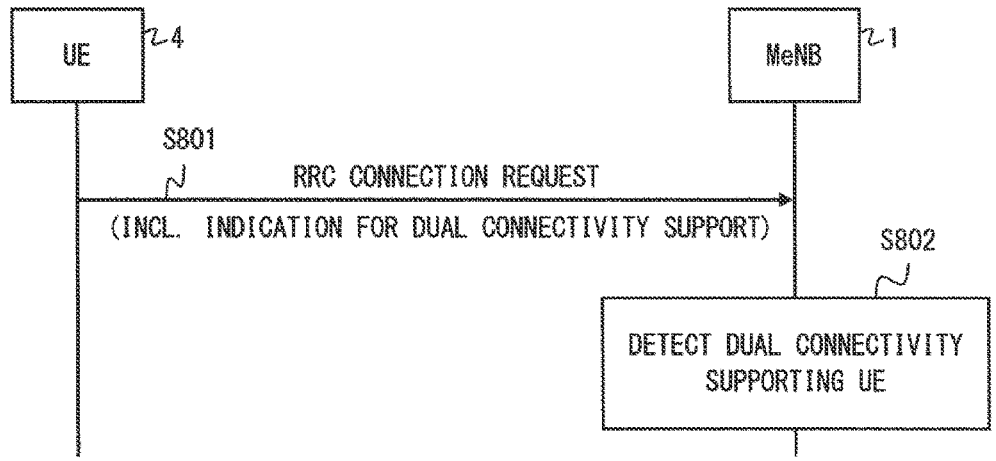
FIG. 16 is a sequence diagram showing one example of a communication control method according to a third embodiment.

FIG. 16 is a sequence diagram showing the first detection procedure. In the first detection procedure, the UE 4 sends dual-connectivity support information to the MeNB 1 (Step S801). The UE 4 may notify the MeNB 1 that the UE 4 supports (or does not support) the dual connectivity. The MeNB 1 receives the dual-connectivity support information from the UE 4 and determines whether the UE 4 supports the dual connectivity (Step S802).

For example, the UE 4 may indicate the support of the dual connectivity using an RRC connection request message or RRC Connection Setup Complete message transmitted during the RRC connection establishment procedure. For example, the UE 4 may indicate the support of the dual connectivity using an establishment cause contained in the RRC connection request message. The UE 4 may indicate the support of the dual connectivity using an attach type or request type contained in an Attach Request message as the initial NAS message.

(Second Detection Procedure)

In the second detection procedure, the MeNB 1 operates a special cell that can be accessed only by dual-connectivity-supporting UEs. The MeNB 1 determines that the UE 4 which has accessed this special cell as a dual-connectivity-supporting UE. In one example, the special cell, which can be accessed only by dual-connectivity-supporting UEs, may be a cell which has an assignment of reference signals (RSs) different from that of a legacy cell that can be accessed by UEs (legacy UEs) that do not support the dual connectivity. Alternatively, the special cell, which can be accessed only by dual-connectivity-supporting UEs, may be a cell that uses a special frequency band that cannot be used by the legacy UEs.

(Third Detection Procedure)

Figure 17:
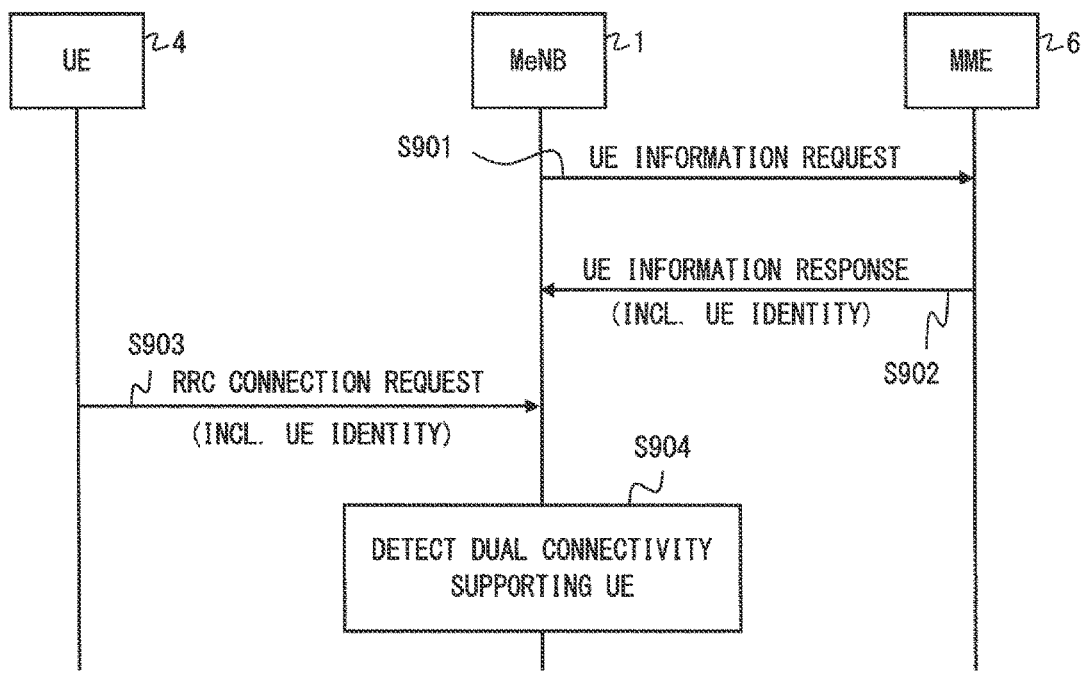
FIG. 17 is a sequence diagram showing another example of the communication control method according to the third embodiment.

FIG. 17 is a sequence diagram showing the third detection procedure. In the third detection procedure, the MeNB 1 obtains identification information (e.g., TMSI) of a dual-connectivity-supporting UE (Steps S901 and S902). The MeNB 1 receives the identification information of the UE 4 when the UE 4 connects to a network. In the example shown in FIG. 17, the MeNB 1 receives an RRC Connection Request message containing the identification information of the UE 4 (e.g., TMSI) (Step S903). The MeNB 1 then determines whether the UE 4 is a dual-connectivity-supporting UE or not, according to whether the identification information of the UE 4 coincides with the identification information of dual-connectivity-supporting UEs (Step S904).

According to this embodiment, the MeNB 1 can determine whether the UE 4 supports the dual connectivity. Accordingly, the MeNB 1 can easily determine whether to set up the U-Plane bearer for the UE 4 to the MeNB 1 or to the LPN 2 according to whether the UE 4 supports the dual connectivity.

Other Embodiments

The above-described first to third embodiments may be appropriately combined.

All the communication control methods in the dual-connectivity scenario performed by the MeNB 1, the LPN 2, the UE 4, the MME 6, and the S-GW 7 described in the first to third embodiments may be implemented by using a semiconductor processing device including an Application Specific Integrated Circuit (ASIC). Alternatively, these methods may be implemented by causing a computer system including at least one processor (e.g., microprocessor, Micro Processing Unit (MPU), Digital Signal Processor (DSP)) to execute a program. Specifically, one or more programs including instructions to cause a computer system to perform the algorithms shown in the flowcharts and the sequence diagrams may be created and these programs may be supplied to a computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide a program to a computer via a wired communication line (e.g., electric wires, and optical fibers) or a wireless communication line.

In the above first to third embodiments, the LTE system has been mainly described. However, these embodiments may be applied to radio communication systems other than the LTE system, for example, a 3GPP Universal Mobile Telecommunications System (UMTS), a 3GPP2 CDMA2000 system (1×RTT, High Rate Packet Data (HRPD)), a Global System for Mobile Communications (GSM) system, or a WiMAX system.

Further, the above embodiments are merely examples of applications of technical ideas obtained by the present inventors. Needless to say, these technical ideas are not limited to the above embodiments and may be changed in various ways.

This application is based upon and claims the benefit of priority from Japanese Patent Application No. 2013-004435, filed on Jan. 15, 2013, the disclosure of which is incorporated herein in its entirety by reference.

REFERENCE SIGNS LIST

1 BASE STATION (MeNB)
2 BASE STATION (LPN)
4 MOBILE STATION (UE)
5 CORE NETWORK (EPC)
6 MOBILITY MANAGEMENT APPARATUS (MME)
7 DATA TRANSFER APPARATUS (S-GW)
15 CONTROLLER
25 CONTROLLER
45 CONTROLLER
62 BEARER SETUP CONTROLLER
75 BEARER CONTROLLER
80 TUNNEL

The invention claimed is:

1. A radio communication system comprising: a first base station configured to operate a first cell; at least one second base station, each of which is configured to operate a second cell; a core network including a mobility management apparatus and a data transfer apparatus; and a mobile station having a capability to establish a data radio bearer in the second cell when the mobile station has established a signaling radio bearer in the first cell, wherein the first base station is configured to: receive, from the mobile station through the signaling radio bearer, a signal containing a Non-Access Stratum (NAS) message that causes a setup of a data bearer in the data transfer apparatus; and send to the mobility management apparatus, when forwarding the NAS message to the mobility management apparatus, a control message that requests the mobility management apparatus to postpone the setup of the data bearer, and send, after sending the control message, a setup request for setting up the data bearer to the mobility management apparatus, wherein the first base station is configured to: receive, after sending the setup request to the mobility management apparatus, a bearer context regarding the data bearer from the mobility management apparatus; send the bearer context to a selected base station that has been selected from at least one second base station as a base station to terminate the data bearer; and send, after the data bearer has been configured in the selected base station, base station information indicating the selected base station to the mobility management apparatus.

2. The radio communication system according to claim 1, wherein the mobility management apparatus is configured to receive the NAS message, perform a connection procedure for connecting the mobile station to the core network or a location update procedure regarding the mobile station without performing a setup procedure for setting up the data bearer, and send to the first base station a response regarding the connection procedure or the location updating procedure.

3. The radio communication system according to claim 2, wherein, upon receiving the response, the first base station is configured to instruct the mobile station to notify the first base station of measurement information regarding the at least one second base station.

4. The radio communication system according to claim 3, wherein the first base station is configured to receive the measurement information from the mobile station and select, from the at least one second base station, a selected base station to terminate the data bearer.

5. The radio communication system according to claim 1, wherein the setup request contains base station information indicating a selected base station that has been selected from the at least one second base station as a base station to terminate the data bearer.

6. The radio communication system according to claim 5, wherein the mobility management apparatus is configured to receive the setup request from the first base station and request the data transfer apparatus to set up the data bearer with the selected base station.

7. The radio communication system according to claim 1, wherein the first base station is configured to determine whether the mobile station has the capability.

8. The radio communication system according to claim 7, wherein the mobile station is configured to transmit, to the first base station, attribute information indicating the presence or absence of the capability.

9. The radio communication system according to claim 7, wherein
the first cell is a cell to which only a mobile station that has the capability can belong, and
the first base station is configured to determine that the mobile station has the capability based on an access by the mobile station to the first cell.

10. The radio communication system according to claim 1, wherein the control message indicates that a selected base station that terminates the data bearer has not yet been determined.

11. A mobile station used in combination with the radio communication system according to claim 1, the mobile station comprising:
a radio communication unit; and
a controller configured to control the radio communication unit to receive configuration information regarding the data radio bearer from the first base station and receive or transmit user data through the second cell.

12. The mobile station according to claim 11, wherein the controller is configured to transmit, before establishing the data radio bearer in the second cell, measurement information regarding at least one second base station to the first base station.

13. The mobile station according to claim 11, wherein while performing a procedure for establishing the signaling radio bearer in the first cell, the controller is configured to transmit, to the first base station, attribute information indicating the presence or absence of the capability.

14. A first base station comprising: a radio communication unit configured to operate a first cell; and a controller, wherein the controller is configured to: receive, from a mobile station through a signaling radio bearer in the first cell, a signal containing a Non-Access Stratum (NAS) message that causes a setup of a data bearer in a data transfer apparatus within a core network, the mobile station having a capability to establish a data radio bearer in a second cell of a second base station when the mobile station has established the signaling radio bearer in the first cell; and send to the mobility management apparatus, when forwarding the NAS message to a mobility management apparatus within the core network, a control message that requests the mobility management apparatus to postpone the setup of the data bearer, and send, after sending the control message, a setup request for setting up the data bearer to the mobility management apparatus, wherein the controller is configured to: receive, after sending the setup request to the mobility management apparatus, a bearer context regarding the data bearer from the mobility management apparatus; send the bearer context to a selected base station that has been selected from at least one second base station as a base station to terminate the data bearer; and send, after the data bearer has been configured in the selected base station, base station information indicating the selected base station to the mobility management apparatus.

15. The first base station according to claim 14, wherein the controller is configured to receive measurement information regarding at least one second base station from the mobile station, and select, from the at least one second base station, a selected base station to terminate the data bearer.

16. The first base station according to claim 14, wherein the setup request contains base station information indicating a selected base station that has been selected from at least one second base station as a base station to terminate the data bearer.

17. The first base station according to claim 14, wherein the controller is configured to determine whether the mobile station has the capability.

18. The first base station according to claim 17, wherein the controller is configured to receive, from the mobile station, attribute information indicating the presence or absence of the capability.

19. The first base station according to claim 17, wherein
the first cell is a cell to which only a mobile station that has the capability can belong, and
the controller is configured to determine that the mobile station has the capability based on an access by the mobile station to the first cell.

20. A communication control method in a first base station that operates a first cell, the communication control method comprising: receiving, from a mobile station through a signaling radio bearer in the first cell, a signal containing a Non-Access Stratum (NAS) message that causes a setup of a data bearer in a data transfer apparatus within a core network, the mobile station having a capability to establish a data radio bearer in a second cell of a second base station when the mobile station has established the signaling radio bearer in the first cell; sending to the mobility management apparatus, when forwarding the NAS message to a mobility management apparatus within the core network, a control message that requests the mobility management apparatus to postpone the setup of the data bearer; and sending, after sending the control message, a setup request for setting up the data bearer to the mobility management apparatus; receiving, after sending the setup request to the mobility management apparatus, a bearer context regarding the data bearer from the mobility management apparatus; sending the bearer context to a selected base station that has been selected from at least one second base station as a base station to terminate the data bearer; and sending, after the data bearer has been configured in the selected base station, base station information indicating the selected base station to the mobility management apparatus.

21. The method according to claim 20, further comprising:
receiving measurement information regarding at least one second base station from the mobile station; and
selecting, from the at least one second base station, a selected base station to terminate the data bearer.

22. The method according to claim 20, wherein the setup request contains base station information indicating a selected base station that has been selected from at least one second base station as a base station to terminate the data bearer.

23. The method according to claim 20, further comprising determining whether the mobile station has the capability.

24. The method according to claim 23, wherein the determining includes receiving, from the mobile station, attribute information indicating the presence or absence of the capability.

25. The method according to claim 23, wherein
the first cell is a cell to which only a mobile station that has the capability can belong, and
the determining includes determining whether the mobile station has the capability based on an access by the mobile station to the first cell.

26. A non-transitory computer readable medium that stores a program for causing a computer to perform a communication control method in a first base station that operates a first cell, wherein the communication control method comprises: receiving, from a mobile station through a signaling radio bearer in the first cell, a signal containing a Non-Access Stratum (NAS) message that causes a setup of a data bearer in a data transfer apparatus within a core network, the mobile station having a capability to establish a data radio bearer in a second cell of a second base station when the mobile station has established the signaling radio bearer in the first cell; sending to the mobility management apparatus, when forwarding the NAS message to a mobility management apparatus within the core network, a control message that requests the mobility management apparatus to postpone the setup of the data bearer; and sending, after sending the control message, a setup request for setting up the data bearer to the mobility management apparatus; receiving, after sending the setup request to the mobility management apparatus, a bearer context regarding the data bearer from the mobility management apparatus; sending the bearer context to a selected base station that has been selected from at least one second base station as a base station to terminate and terminates the data bearer; and sending, after the data bearer has been configured in the selected base station, base station information indicating the selected base station to the mobility management apparatus.

* * * * *